(12) United States Patent
Heyen

(10) Patent No.: US 9,551,459 B2
(45) Date of Patent: Jan. 24, 2017

(54) MULTIFUNCTIONAL ULTRAPORTABLE SUPPORT

(71) Applicant: André Heyen, Malmédy (BE)

(72) Inventor: André Heyen, Malmédy (BE)

(73) Assignee: NEWCONCEPTS S.À.R.L. & CO, S.E.C.S., Weiswampach (LU)

( * ) Notice: Subject to any disclaimer, the term of this patent is extended or adjusted under 35 U.S.C. 154(b) by 345 days.

(21) Appl. No.: 14/024,712

(22) Filed: Sep. 12, 2013

(65) Prior Publication Data

US 2014/0077054 A1     Mar. 20, 2014

(30) Foreign Application Priority Data

Sep. 12, 2012 (LU) ........................................ 92 072
Apr. 23, 2013 (LU) ........................................ 92 186

(51) Int. Cl.

| | |
|---|---|
| A47B 97/04 | (2006.01) |
| F16M 13/04 | (2006.01) |
| A47B 23/00 | (2006.01) |
| A47B 23/04 | (2006.01) |
| F16M 11/04 | (2006.01) |
| F16M 11/16 | (2006.01) |

(52) U.S. Cl.
CPC ............ F16M 13/04 (2013.01); A47B 23/002 (2013.01); A47B 23/044 (2013.01); F16M 11/04 (2013.01); F16M 11/16 (2013.01); A47B 2023/049 (2013.01)

(58) Field of Classification Search
CPC ................ A47B 23/002; A47B 23/044; A47B 2023/049; F16M 11/04; F16M 11/16
USPC ........ 248/444, 441.1, 454, 460, 463, 346.03; 108/42, 43; 361/679.09; 16/221, 231
See application file for complete search history.

(56) References Cited

U.S. PATENT DOCUMENTS

| | | | | |
|---|---|---|---|---|
| 5,127,339 A | * | 7/1992 | Hood, Jr. | ............ A47G 23/0608 108/42 |
| 5,263,423 A | * | 11/1993 | Anderson | ................. A45F 5/00 108/43 |
| 6,496,360 B1 | * | 12/2002 | Cordes | ................. A47B 23/002 108/43 |
| 6,663,072 B1 | * | 12/2003 | Ritchey | .................... A45C 3/02 248/346.03 |

FOREIGN PATENT DOCUMENTS

| | | |
|---|---|---|
| CA | 2609397 A1 | 4/2009 |
| GB | 220337 | 8/1924 |

* cited by examiner

Primary Examiner — Todd M Epps
(74) Attorney, Agent, or Firm — Cantor Colburn LLP

(57) ABSTRACT

Ultraportable support (A, B, B', C, D, E), comprising at least two feet (2) attached by means of hinges (3) allowing rotation of said feet (2), a locking system (5) of the hinges (3) allowing to maintain the feet (2) into different angular positions, the support further comprises at least two straps (4) whose width is substantially constant over the entire length, each of the straps (4) being attached to the two opposed feet (2) at a location of the foot distant from the hinges (3).

8 Claims, 19 Drawing Sheets

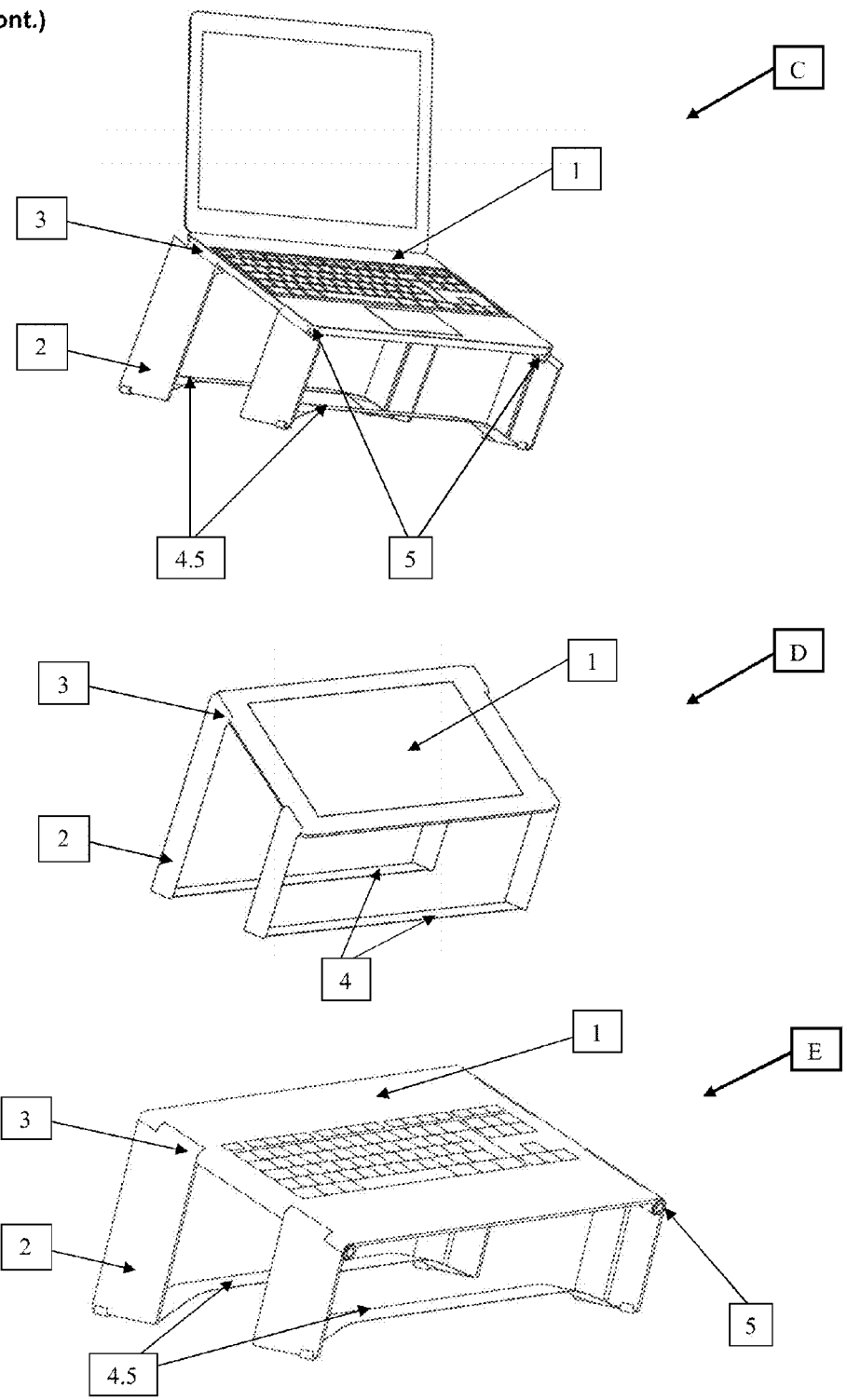

MULTIFUNCTIONAL ULTRAPORTABLE SUPPORT

TECHNICAL FIELD

The present invention relates generally to a ultraportable multi-purpose support to maintain in an elevated and ergonomic position a laptop/notebook/ultrabook computer, a tablet computer, a tablet plugged into a keyboard, a smartphone and/or paper documents. In addition, the support can be used on any surface, even irregular, especially on the knees.

BACKGROUND

A large amount of support-like products do exist whose stated goal is to allow the user to work comfortably, even in the absence of a table, for example during traveling, in an armchair, on a bed, . . . . Many of these solutions, however, are limited to stationary applications, e.g. in the office or at home, because they are not portable at all or too heavy or cumbersome to be easily carried away.

Among these solutions, a lot of them however can be considered portable in the sense that the user can carry them away with him.

However, these known solutions usually have one or more disadvantages in practice, respectively, an advantage is obtained at the expense of other desired features. Thus, a disadvantage of portable support with folding feet is, for example, that they often require different settings at different places to find a position at least partially ergonomic. If ergonomics was the criterion of choice, the use of the support is often limited to certain situations, such as either sitting or lying down. Contrariwise, if lightness was the main criterion of development, stability, strength and/or flexibility are often lacking. The user comfort is also often sacrificed in order to offer an aesthetic solution.

In view of the existing solutions, it is clear that there is a need for a support type of products, but the great difficulty seems to reside in the apparent incompatibility requirements, respectively, in the apparent contradiction of the effects of the necessary measures to fulfill them.

BRIEF SUMMARY

The invention provides a support device that is easily transportable and therefore relatively lightweight and compact for transport and allows a comfortable and ergonomic utilization even on uneven surfaces, such as on the knees in particular. The invention should therefore allow the user to work with a laptop/notebook/ultrabook computer, a tablet computer and/or a smartphone, in an raised and ergonomic position, anywhere: in a plane, a train, a car, on a chair, a coach, a bed, . . . .

In order to solve the problem mentioned above, the present invention provides a multifunction support, including at least two feet attached by means of hinges allowing rotation of said feet, a locking system of the hinges allowing to maintain the feet into at least two different angular positions, one of said positions corresponding to a folded position for transport or storage and another angular position corresponding to a said unfolded position for support utilization. The support is characterized in that it further comprises at least two straps, each of the straps being attached to the two opposed feet at a location of the foot distant from the hinges.

A first major advantage of the presence of straps according to the invention is that they allow to lay the support on all kinds of surfaces, even irregular, such as on the knees (thighs), on a thick bed quilt, etc. . . . When the user crosses his legs, even while the support rests on his knees, the straps fit perfectly. The adaptation is automatic and instantaneous, there is no need for adjustments when changing the position. A second advantage is the great stability achieved even on irregular and convex surfaces. A third plus is that the straps offer a perfect load distribution, which is a particularly important criterion for comfort, especially when the support is laying on a body part, such as on the knee(s). Fourth, the straps offer a useful and necessary working height, especially when using the knee(s). A fifth benefit, despite the apparent inconsistency with the benefits above, the straps contribute to the compactness and lightness of the product, because they can be made of a thin material, lightweight and durable. Sixth, the use of straps (for example instead of strings with an enlarged central portion for example) ensures they unbend automatically during the unfolding of the support and thus avoid having to check and adjust their position or orientation when laying the support on the knee(s). Finally, the presence of straps does not impede to use the support on a rigid and flat surface like a table. Such an elevated use is although useful when the table is low or when the user is standing at the table, for example during a presentation.

In the context of the present invention, the term <<strap>> is to be understood in its usual and primary meaning, i.e. a <<wide and flat ribbon or belt (leather, fabric, cloth, silk, plastic, fiberglass or other durable material)>>. In fact, a <<strap>> as used herein is a strip with an essentially constant width (i.e. the width does not vary by more than 10%) over the length of the strap and this width may vary between 1 and 15 cm, preferably between 2 and 10 cm, more preferably between 2.5 and 7.5 cm, for example about 3, 4 or 5 cm. The thickness is generally between 0.1 and 5 mm, preferably between 0.3 and 3 mm. In general, the ratio between the width and the thickness of the strap is at least 10, preferably at least 30 and the ratio is preferably between 10 and 500, more preferred between 30 and 200. It therefore does not have an approximately circular section, such as a string, a rope, a wire or cable. It neither has a substantially circular section in some areas, nor is it an assembly of flat portion(s) and circular section portion(s).

Ideally, the portion of the strap between the fixations on the two opposite feet (portion of the straps resting on the knees) has a length equal or slightly greater than the distance between the fixations on the two opposite feet to which the strap is attached when the support is in the unfolded position (distance between the base of the feet in utilization), for example 0.5 to 10% longer. In other words, the portion of the strap resting on the knees (or other surface) is not tight. This allows the strap to take on the shape of the contact surface and distribute the load. The length of the straps can also be adjustable, for example by means of adjustment buckles, magnets, retractors, Velcro-type fasteners . . . .

As described in more detail below, the support feet can be attached directly to each other by hinges or indirectly through a plate. In the latter case the feet are attached laterally on each opposite side of a plate. It should be noted that the term "plate" is to be understood broadly in the sense that it can represent in its simplest example a rectangular shape, but can also be a laptop/notebook/ultrabook computer, a tablet computer, a keyboard or a frame, as presented more fully below.

In order to avoid that the straps protrude or cause discomfort in a folded position (for transport), it may be advantageous or desirable to foresee one of the following solutions (non-exhaustive list):

- An elastic area within the strap (optionally with a maximum extension limit): longer strap under load (in use), but shorter in folded position
- A strap retractor: the strap automatically retracts during folding of the feet, and unrolls automatically at the opening
- Fold the strap on itself (strap sufficiently flexible and/or strap with hinges). Depending on the geometry of the support, the straps may be twisted when folding the feet (but unbend automatically when opening, as explained above). This may be acceptable and will not be a major concern. It is however possible to place orthogonal or oblique hinges at specific locations of the strap to facilitate the withdrawal or folding of the straps between the feet and the plate or between the feet, so that the straps are perfectly parallel to the feet and/or plate in the folded position. For a similar result, the strap can be made of flexible parts and slightly less flexible parts. During the folding of the feet, the less flexible zones will stay flat and force the folding to take place at the flexible zones and allow the strap to follow the feet during their rotation. The folding of the straps can also be improved by connecting one or more locations of the strap with a spring-like or elastic material to a fixed element, such as an area close to the hinge between the plate and the feet. During the folding of a foot, the elastic is going to pull on the specific location of the strap to bring the strap in a predetermined position.
- To attach the straps to the feet, the use of articulated fasteners (free to rotate) avoids the problem of torsion of the straps explained in the previous section. Indeed, the straps can then be substantially perpendicular to the feet in utilization and parallel to the feet (and plate) when folded.
- Attachment of the strap on both sides of the plate or feet, for example with a Velcro-type fastener or magnet, which can serve as a locking system for holding the support in a folded position (for storage or transport).

In general, the straps have identical top and bottom surfaces. However, if desired, one surface of the straps (or both) may be provided with a non-slip surface or a non-slip coating to further increase the stability of the support during use. The lower surface of the strap (for example in contact with the knees) or a portion of this contact surface can optionally be coated with a soft material (for example foam-type) to further increase the comfort of the support. Preferably, the lower surface of the strap (to be placed on the knees) is provided with a non-slip coating and the opposite surface is smooth or slippery. Indeed, the fact that the top is smooth or slippery is particularly advantageous because it makes the folding of the straps easier: less friction between the strap and the plate allows a natural and automatic centering of the straps in the center of the plate when the feet fold and thus promotes a good and flat storage of the straps.

To further increase stability, the straps are preferably as far as possible from each other, but by ensuring that the greatest distance between two adjacent straps (width of straps included) is not greater than the length of a thigh, i.e. generally about 35 to 40 cm, so that the rear strap doesn't fall off the knees. In general, two straps do not only offer an excellent stability, but allow the strap to take on the shape of the underlying contact surface. However, if desired, a larger number of straps may be provided, for example 3 or 4.

The straps are generally attached to the bottom (or near the bottom) of the feet (foot base, foot part opposite to the hinge between the foot and the plate), in a removable manner or not. In principle, they can be attached by any suitable means. For example, they can be riveted to the feet, or attached with specific fixations (freely rotating or not). They may also be attached for example through an opening or slot in the bottom of the foot (by passing the end of the strap through the slot), or by sewing, gluing, stapling, riveting or by means of magnets or fasteners such as clips. A combination of different means is also possible, for example on both of the two ends of each strap.

In a preferred embodiment, there may be three or four openings or fixation systems (at different distances from the user side to the opposite side, optionally at different heights of the feet) and only use two straps attaching them as needed to selected openings or fixation systems, which offer the best suited position to the physiology of the user or the specific use conditions. Alternatively or in addition, there may be longer openings with a system that allows to position the strap on one side of the opening or on the other side. In the case of use of fasteners other than slots, such as metal or plastic fasteners, these may be adjustable in position, or redundant in different positions so that the user can select the fasteners to which the straps are secured.

In particular (but not exclusively), one or more additional straps (or longer straps) may be provided to allow surrounding the thighs and securing the support to the thighs for example (to one thigh if applicable). This is useful for example when the support is used with a tablet computer (e.g. iPad® or e-reader) where the pressure on the touchscreen tends to tilt the whole, or when the support is used in the field of video games where sudden movements are made on a joystick, buttons, a wheel or other accessory sets.

The material used for the straps can be any material or combination of suitable materials known by the professional. It should be noted that in the context of the present invention, a strap can be set to a flat rectangular section of fibers (woven, braided, etc. . . . ), but can also be made of solid material. In this case, the materials used are polyamides such as Nylon® or Aramid®, Dyneema® (UHMW polyethylene), polypropylene, polyester, coated glass fibers, any types of plastics, etc. . . . .

In the context of the present invention, the multifunction support can basically take two forms or configurations, one folded for transport or storage and the other unfolded for use. In the "transport position" or "storage position" or more simply "folded position" feet are folded in/on/under the plate by rotation around the hinges and possibly secured in this position by a locking system. The angle of the feet when folded is about 0° (0°±5°) to each other or relative to the plane of the plate if applicable. The feet are then in substantially parallel planes and, when applicable, parallel to the plane of the plate. (If other accessories are included in the support, they can optionally also have a folded position for transport or storage, see below.) In "use position" or "unfolded position" feet are unfolded, i.e. oriented at an angle different from the folded position.

With the utilization of a "plate", the angle of the feet when unfolded varies between 60° and 130° relative to the plane of the plate, for example at an angle of about 90 to 105° (again, if other accessories are included in the carrier, they can optionally also have an unfolded position or state of use). In a preferred embodiment, the angle of the feet relative to the plate is selectable from a value of about 0° for transport in the folded position and a value between 60 and 130°, preferably between 90° and 110°, more preferably approximately 90° in the unfolded utilization position.

In a preferred embodiment, an additional hinge in the feet may be provided in a plane orthogonal to the plane of the hinge between the foot and the plate. It allows to rotate the feet along the axis of the thighs, which reduces the length of the foot and therefore their weight and gives more stability to the whole, moving the center of gravity towards the center of the plate. One extra advantage is that the maximum working height for a defined plate size is higher, as feet can't ideally protrude the plate in the folded position. The higher the working height is, the longer the feet are and the more benefits this extra articulation brings. To increase the work height, it is also possible to use telescopic feet or feet with an extra hinge for folding on itself.

Without the use of a plate, when the feet are directly tied together in their upper part, the unfolded angle (angle between the feet themselves) can vary between 15° and 75°. In a preferred embodiment, the unfolded angle is selectable between a value of about 0° in the folded position for transport and a value between 15 and 75°, preferably about 30° in the unfolded position for utilization.

In general, indications of angles, dimensions and other numerical values in this document are, unless stated otherwise, approximate values and may therefore vary in practice up to ±10% of the specified value.

The dimensions of the support may vary within useful limits, depending on the intended use and user requirements. In general, if the support includes a plate, it is expected to lay paper documents and allow hand writing. The dimensions of the plate are therefore preferably (but not necessarily) such that it can support most of an A4 document. In practice, the width of the plate (and therefore in principle of the support) will vary between 15 and 70 cm, preferably between 20 and 45 cm and the depth of the plate between 15 and 50 cm, preferably between 15 and 40 cm. It should be noted that for very narrow supports (15 to 25 cm), the use on both knees is possible if the distance between the feet (at the straps level) is sufficient (>30-35 cm). This can be achieved by an unfolded angle of the feet above 90°, for example between 90 and 120°. Furthermore, a narrow support may (also) be used with an unfolded angle of about 90°, but then the user holds the support on one knee at a time.

For supports with larger plate, it is possible to foresee one (or more) hinge(s) through the plate, for example a central hinge (longitudinal or transverse), so as to further reduce the dimensions of the support in the folded position for transport. With two hinges, it is possible to create a space between both parts of the plate in folded position, which can then enfold a tablet computer, a laptop/notebook/ultrabook computer or a smartphone. The support then serves as a case and protects the device during transport or storage.

The shape of the contour of the support plate can vary: square angles, rounded, etc. . . . A rounded wavelike cut may optionally be made at the center of the lower side of the support (the side facing the user). This will allow to reduce the distance between the support and the user, which may be useful for a "bellied user". Indeed, for an overweight person or a person with short legs, the top strap may slip beyond the knees. Bringing the support closer is favorable in this case.

Along the lower side of such a plate, adjustable removable or fixed stops will prevent the computer, book or documents from slipping off the support. For the same reason, a coating or non-slip layer (material, varnish, paint, . . . ) can be applied on the upper surface of the plate (or at specific locations).

The plate, in its broadest sense, can be a keyboard. A computer keyboard may also advantageously be included in/on the plate. The keys are preferably not protruding the surface of the plate, such as documents or a computer can be deposited on the support without touching (or damaging) the keyboard. The keys can be mechanical or sensitive. Part or the entire surface of the plate may be sensitive (capacitive touch sensing) or optical (virtual keyboard by holographic light projection). A support with integrated keyboard is useful for computers without keyboard as tablet computers (e.g. iPad®), for smartphones or for television (smart tv). Connecting the keyboard to the computer or other electronic devices, such as smartphone or smart tv, can be wired (e.g. via USB or specific connectors relative to brands and models), but can also be performed wirelessly, for example by Bluetooth®, WiFi, etc. Even a laptop computer with keyboard can be used on a support with integrated keyboard because the rubber feet of the computer are usually located outside the area of the integrated keyboard. The keys of the keyboard may optionally be backlit.

In fact, despite the possible presence of the keyboard, documents can be placed on the support. To write on documents that are flexible or thin (A4 paper sheets for example), it may be advantageous to use a document case or a plastic or rubber sheet between the document and plate/keyboard. This plastic or rubber sheet can be provided with each carrier and easily stored in the bag of the laptop or iPad®. To prevent slippage of the computer, books or documents, the material of this sheet can be anti-slipping or its upper surface can be covered with a non-slip coating (varnish, paint, . . . ).

A further variant to obtain a perfectly flat surface for writing would be to fix the keyboard inside a cut-out in the plate, and for instance be rotated 180° along its central axis or be removed, turned over and re-inserted, so that the keyboard is oriented downward (under the plate) if not needed or for transport.

In some preferred embodiments, the plate includes (in addition) a fastening system for a tablet computer, smartphone, laptop/notebook/Ultrabook® or screen and optionally specific connectors to brands and models used to connect the keyboard of the support, its built-in battery, its touchpad, its numpad and/or a separate power supply.

In such a case, the plate may comprise a groove or a rail (optionally adjustable in rotation), and optionally additional fixations to secure the computer in an inclined plane relative to the plate, optionally adjustable in rotation. Specific connectors to the brands and models of the devices can be present at the bottom of the groove or rail, allowing the link to the numpad, keyboard, touchpad or integrated battery.

Such a fastening system may be provided to allow positioning and holding a portable computer (e.g. tablet type, like iPad®) and/or a smart phone ("smartphone", e.g. iPhone®) not in the plane of the plate as described below, but at a certain angle relative to the plate (possibly selectable angles), the device being placed in either landscape position or portrait position. The holding should be strong enough so that the user can push on the touch screen in a convenient and comfortable way. Among other possibilities, a suitable system comprises a groove or rail (which may be magnetic) for the lower side of the device and another system to further hold the back face, the upper side or the sides of the device. Holding the lower side may not be enough. By moving the assembly (support and electronic device(s)), there may be a risk for the device(s) to slip off. There are several ways to strengthen the holding of these accessories on the support. Here are some examples:

An elastic or cord or rigid rod (optionally with adjustable length) with two fixations at both ends, one end being attached to the support and the other end to the device (preferably on the upper area). This holding system can also be used for a specific application: using a tablet type computer with its keyboard (like the iPad® with keyboard or Asus Transformer® or HP Envy® or Clamcase®) deposited or secured on the plate or frame.

An articulated piece type gusset clipping on the back of the computer or phone or in a shell case holding this device. This gusset can be part of the plate and, thanks to a hinge, will be in the plane of the plate (folded position) or tilted to clip and hold the device (working position). Several gussets can be foreseen for positioning multiple devices at the same time on the support. This will allow to develop and use specific applications on multiple devices (e.g. transferring data from one device to another, managing a smart tv with a smartphone and a tablet simultaneously, . . . ).

In other embodiments, the fastening system for an (ultra) portable computer (e.g. a tablet type computer) allows its fixation in the plane of the plate. It is preferably formed by specific cut-outs in the plate and fasteners or snap-fitting to secure the device in the plane of the plate itself. It is also possible to have a small angle between the device and the plate when the device is plugged to an accessory. For example, tablet cases like the iPad Smartcover® maintain the iPad® at an angle when the case is folded in use position. The plate of the support then contains a fixation system (e.g. a groove, optionally with magnets) for the case and a fixation system (e.g. a groove, optionally with magnets) for the bottom of the device. It is also possible to attach the device directly to the feet, instead of the plate.

In a further embodiment of this type, the plate can be formed simply by an intermediate fastener adapted to secure such a device. Thus, the fastener can be made for example in the form of a frame or a shell (case, cover) comprising fasteners adapted to the model or type of device. Such a "plate" is then reduced to one frame to which are fixed the feet as described here. An advantage of this reduction of the plate to a frame is that it brings a weight reduction of the support. It should be noted that according to the context in the present invention, the term "plate" in this case may designate the frame or shell (case or cover) and may include the computer (tablet, laptop, smartphone, . . . ). In general, the plate can integrate other functions as described with more details in this document.

Alternatively, or in addition, the support may include a numeric keypad (numpad). Preferably it will be a carrier part which, after rotation (180° relative to the transport position), will be outside of the plate. In a preferred embodiment, a button on the hinge between the foot and the plate (see below) will unlock the numpad. For example, the foot turns by 90° and the keypad turns by 90° or 180° (90° to stay in alignment with the foot in use position and not be used, and 180° to become an extension of the plate and be used). In a preferred embodiment, this carrier part will hold a smartphone that will act—among other diversified possible applications—as the numeric keypad (via a wired or wireless connection). The fixation of the smartphone to the carrier can be magnetic or mechanical.

A keypad or numpad can be useful with or without a keyboard integrated in the plate of the support. With keyboard, the keyboard and the keypad can be connected to a tablet computer, smart TV, smartphone, etc. . . . . Without integrated keyboard, the keypad can be connected (via USB, Bluetooth®, WiFi, etc.) to a laptop/notebook, ultrabook that does not have a numeric keypad. Thanks to a power supply (battery or solar cell) and a calculator display, the numeric keypad can be used as a standalone calculator. This can be useful if the user works on "paper" documents and there is a need for a calculator. If the support includes a power supply, the keypad keys can optionally be backlit.

Whether for use with a television, a computer, touch screen computer (tablet), a games console or a smartphone, a pointing device can be useful. It can be a separate device such as mouse or integrated such a trackball, joystick, touchpad, steering wheel, etc. . . . . . When the device significantly protrudes the plane of the plate, for example a joystick, it may be designed in a retractable manner (adjustable in rotation) or removable (attached by clipping, screwing, magnets, . . . ). It will not hinder an important feature of the invention, which in this case is the fact that it can be folded flat for an easy transport.

The support has at least two folding feet. The function of these feet is on one hand to offer an ergonomic working height, thanks to the straps (where applicable). The screen of the electronic device placed on the support will be indeed much higher, in the optimum vision zone of the user (so no need to lower the head, for example towards the direction of the knees).

The feet (and other elements of the support) may have any shape or form. Only the features described in this document are important. Cutouts or recesses within the support elements allow a weight reduction.

There is no limit concerning the materials of the various elements of the support. Obviously the weight is a practical and commercial factor. Aluminum and its alloys, all plastic-type materials, leather, composites (including sandwich panel), carbon or carbon fibers, glass or Plexiglas are the materials of choice. Sections or profiles of the elements of the support (plate, feet, . . . ) shown in the figures are essentially rectangular. An effective way to reduce the weight of these elements is to use thin sheets (in a lightweight material such as aluminum or plastic) whose rigidity is provided by specific reinforcement shapes (ribs, flanges, gussets).

In a preferred embodiment, the feet are designed to offer an angle of inclination of the plate towards the user, when they are in the unfolded position. The angle of the plate with a greater height at the back offers an ideal position relative to the user, especially to write, type on the keyboard or press the touch screen of the tablet. This inclination towards the user can be achieved by designing the feet so that their height is lower on the user side than on the opposite side (distant from the user). The difference in height is preferably chosen so as to obtain an angle of inclination of the plate between 2 and 70°, preferably between 10 and 30° relative to the plane formed by the lowest points of the feet (unfolded, use position), respectively relative to the horizontal when it is mounted in a use position on a flat horizontal surface.

When the feet are used without plate, i.e. when they are attached directly to each other, for example for supporting a tablet computer on one thigh, the angle of inclination between the base of the feet and the display is set to be between 20 and 90°, preferably between 45 and 65°.

In case of a support with plate, the height of the feet at the highest point measures ideally at most half the width of the plate (plate, computer, touch pad, keyboard). In this way, the thickness of the whole support in the folded position is minimal. For a higher working height of more than half the width of the plate, feet will have to superimpose (overlap) in folded position. The height of the feet at the highest point can then reach up the whole width of the plate.

A further advantage of some variants of the support is that the inclination of the plate on uneven surfaces can also be adjusted for example by the fixation position and/or the length of the straps (see above).

The hinges allow folding the feet under (or above or inside) the plate to set the support in transport position and unfolding the feet for support utilization. Optionally, according to the type of construction of the feet and/or the plate, hinges can be integrated during molding, or they are independent pieces attached to the feet and/or the plate (screws, rivets, clips, glue, etc. . . . ).

In a further embodiment, when the support feet are directly attached to each other (without plate), both feet have a geometry for housing and holding a tablet computer (iPad®, e-reader) or a smartphone (iPhone® type), or an intermediate part between the feet and the device (shell, case or cover types). In particular, a "case" or "cover" containing the tablet and/or smartphone can turn into a support. One of the edges of the periphery of the case can act as a hinge. After opening, the two sides or faces of the case form an angle and serve as feet.

In a further embodiment, when the support feet are directly attached (without plate), folding lines can be integrated into the feet. Once the support (case) is open, folding the feet along these lines will bring up an inclined surface. This surface allows to clip, attach, maintain and optionally tilt a tablet computer or smartphone, thanks to magnets, Velcro® type scratches or other mechanical fasteners. To enhance the stability of the support, one strap (or both) may be longer to allow surrounding the thigh. This may even allow the user to get into 'standing' position without risking dropping the support (and device attached), which provides a degree of freedom worth for the user. An optional non-slip coating on the straps will prevent slippage of the support along the thigh. In addition, the straps may possibly be used as a lock to hold the support in the closed position (for storage or transport). A closure system other than the straps can be optionally added: Velcro® type scratch, zip along (part of) the periphery of the feet, button and eyelet, pressure, magnets, etc. . . . . In one specific case, when the support is intended to be used on a flat surface (such as a desk or table), the straps are removable or even optional.

The combination of the two previous points is the special case of a support convertible into a case (or box). In other words, a tablet or smartphone case (cover) is convertible into a support, thanks to one edge serving as a hinge between the two sides acting as feet. Fold lines on the feet can generate an inclined surface to lodge, clip, attach, maintain and possibly tilt the tablet or smartphone.

In another embodiment, when the support feet are directly attached to each other (without plate), in addition to the folding system described above, the feet can integrate a system allowing both of the following features: maintain the tablet or smartphone on the generated inclined surface, and hold the feet relative to each other in a predetermined angle. Openings or holes on each foot are superposed when the support is in the open position. It is possible to fit into that opening a piece that will block the feet and optionally attach the tablet computer or smartphone (or their case). Magnets placed on the feet and tablet (or smartphone) car also act as a holding and blocking system: the electronic device will be secured on the generated surface with magnets but in the same time will block the rotation of the feet and maintain them at a predefined opening angle (both feet attached to the electronic device also thanks to magnets).

In another embodiment, a foot or two feet can incorporate the same opening used to fix a tablet or smartphone on the inclined surface generated by folding, but located so that the tablet or smartphone can be attached when stored inside the support (or case if applicable).

In another embodiment, when the support feet are directly attached to each other (without plate), both feet are not identical: the geometry for holding the electronic device is slightly offset to give a side angle to the left or right. As the support is positioned on one thigh only, the screen is not perfectly aligned towards the eyes. The tilt angle given by the geometry difference between the feet orients the screen in the viewing axis of the user. An additional option is to choose which of the two feet will be left or right (during manufacturing or in use by rotation around the top axis) to allow placement of the support on the left or right thigh according to the wishes of the user or whether he is right or left handed.

Rubber feet located at the corner areas allow to put the stand on a table or desk without scratching. Rubber being a non-slip material, it also provides stability.

Various devices may be added to hold pens, pencils, highlighters, gum, cup holder, etc. These devices can be foreseen on the plate itself or on the feet. Spring or magnetic clips will also allow to hold paper documents on the plate.

Batteries can be integrated into the side hinges, in or under the plate or feet allowing to connect (Bluetooth®, Wi-Fi®, . . . ) the keyboard and the iPad® iPhone® or other electronic accessory used, to power the calculator keypad, and/or to extend the battery life of the electronic accessory used (iPad®, iPhone®, . . . ). In this case the support preferably comprises one or more (types of) connectors to connect one or more external electronic accessories.

Solar cells can be integrated to the plate to ensure the connection (Bluetooth®, Wi-Fi®, . . . ) between the keyboard and the electronic accessory used (iPad®, iPhone®, . . . ) to power the calculator keypad and/or to extend the battery life of the electronic accessory used (iPad®, iPhone®, . . . ) or to recharge the integrated battery.

Some embodiments of the support are designed to form a cavity or housing in the folded position in order to store the electronic accessory(ies) and can thus serve as a case or bag or protection for transportation.

BRIEF DESCRIPTION OF THE DRAWINGS

Other features and characteristics of the invention will emerge from the detailed description of some advantageous embodiments described below, as illustration, with reference to the accompanying drawings. These show.

DETAILED DESCRIPTION

Figure 1:
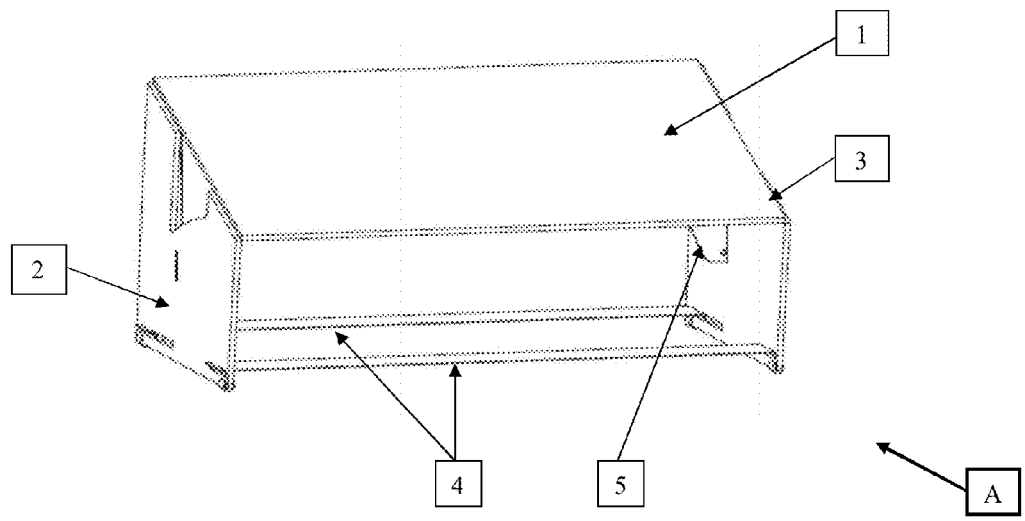
FIG. 1: shows general three-dimensional views of some embodiments of the support.
Figure 1:
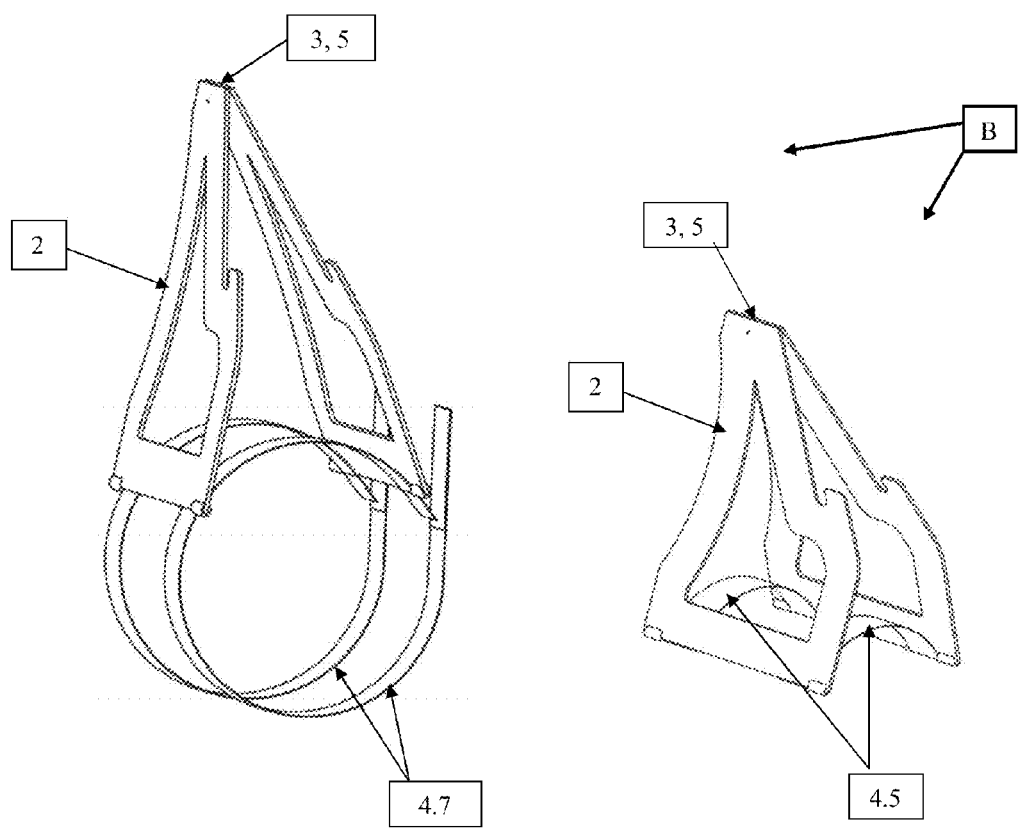

FIG. 1 shows some models of multifunction support A, B, C, D and E.

For the support A, the plate 1 is a simple rectangular plate and is attached by the hinges (or joints) 3 to the feet 2. The feet 2 are held in the unfolded position of 90° relative to the plate (position of use) by the locking system 5 of the hinges 3, in this case in the form of articulated "gusset" 5.1 with a coupling system to the feet 2. The support A includes two straps 4 attached to the feet 2 through (some of the) slots 4.1. In this example, the straps 4 have essentially the same length as the width of the plate 1. The height of the feet 2 is different between the front and back of the support A so as to obtain an angle of inclination of the plate.

The support B is specifically designed to hold a tablet computer (e.g. iPad®). There is no plate in this case, the feet being connected directly to each other by an upper hinge, which can be maintained in open position by the locking device 5 of the hinge 3. The support B has two straps 4 attached to the feet 2, allowing to the whole support to lay on one thigh. The portion of the straps 4 resting on the thigh is here longer than the distance between the two fasteners to the feet 2 to match the contour of the thigh and distribute the load. A version shown has even longer straps 4.2 around the thigh and attached with a Velcro®-type adhesive, enhancing the stability of the support for a safe use of the electronic device.

The support C comprises four feet 2 directly attached to the frame of a laptop computer 1 (thus acting as the plate 1) at the hinges 3. The feet 2 are held in the unfolded position at 90° relative to the plate (position of use) by the locking device 5 inside the hinges 3, which in this case may be either in the hinge of the foot 2 or in the part of the hinge belonging to the frame of the computer. This locking system 5 can unlock the rotation of the feet and block them at certain predetermined positions, in particular at 0° and 90°. The support C includes two straps 4 attached to the feet 2, allowing to lay the support on two thighs. The portion of the straps 4.5 resting on the thigh has here a longer length than the distance between the fasteners on the feet 2, to match the shape of the thighs and distribute the load.

The support D comprises four feet 2 directly attached to the frame of a tablet computer (i.e. iPad®) (thus acting as the plate 1) or to the case (shell) clipped on the back of the tablet. The feet 2 are held in the unfolded position at 90° relative to the plate (position of use) by the locking device 5 inside the hinges 3, which in this case may be either in the hinge of the foot 2 or in the part of the hinge belonging to the frame of the tablet or its case. This locking system 5 can unlock the rotation of the feet and block them at certain predetermined positions, in particular at 0° and 90°. The support D includes two straps 4 attached to the feet 2, allowing to lay the support on two thighs. In this example the straps 4 are essentially of the same length as the width of the iPad® 1.

The support E comprises four feet 2 directly attached to a keyboard (acting the plate 1) at the hinges 3. The feet 2 are held in the unfolded position at 90° relative to the plate (position of use) by the locking device 5 inside the hinges 3, which in this case may be either in the hinge of the foot 2 or in the part of the hinge belonging to the keyboard. This locking system 5 can unlock the rotation of the feet and block them at certain predetermined positions, in particular at 0° and 90°. The support E includes two straps 4 attached to the feet 2, allowing to lay the support on two thighs. The portion of the straps 4.5 resting on the thigh has here a longer length than the distance between the fasteners on the feet 2, to match the shape of the thighs and distribute the load.

Figure 2A:
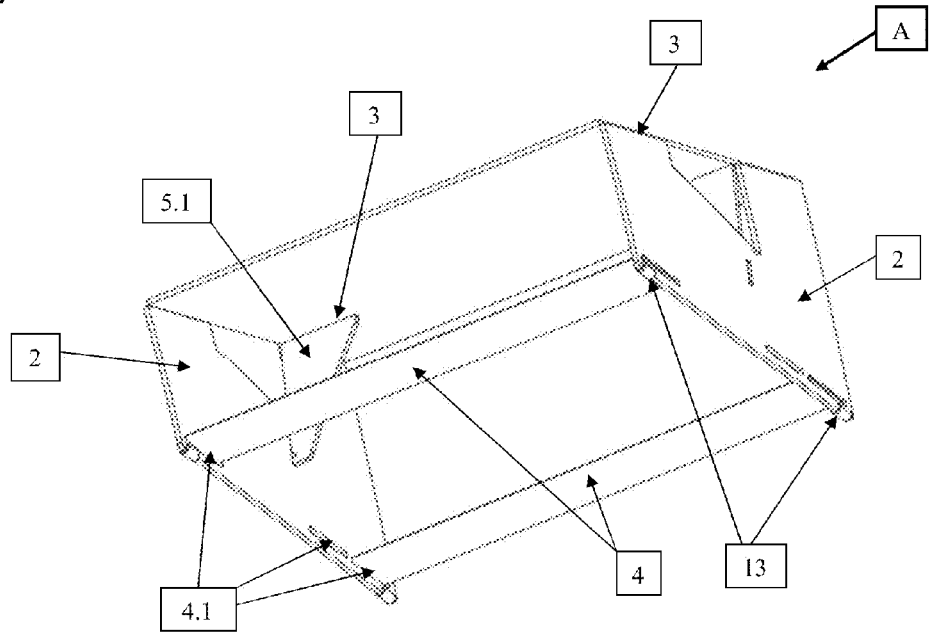
FIGS. 2a-2f: show detailed three-dimensional views of some embodiments of the support.
Figure 2B:
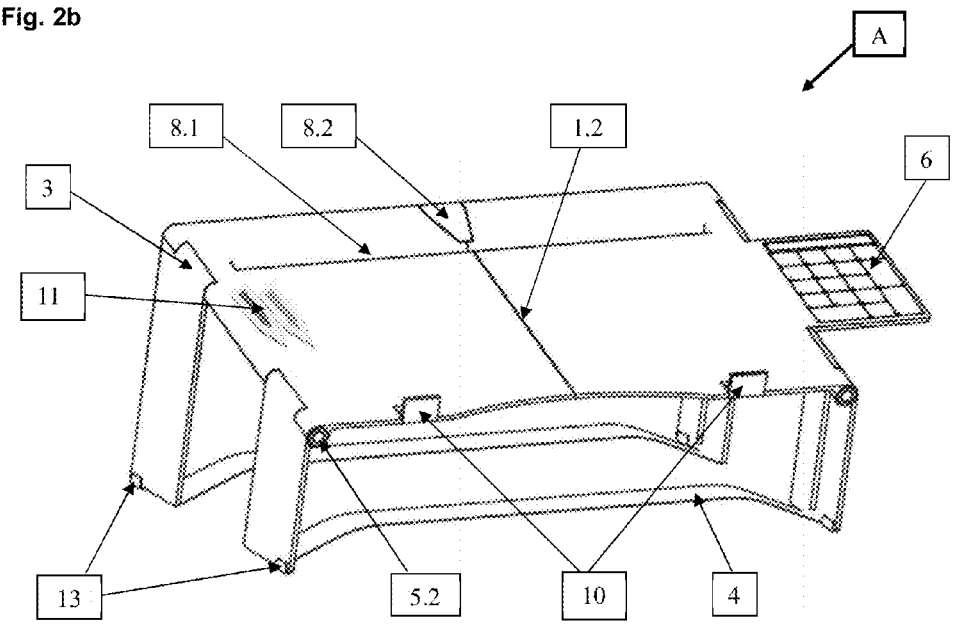
Figure 2C:
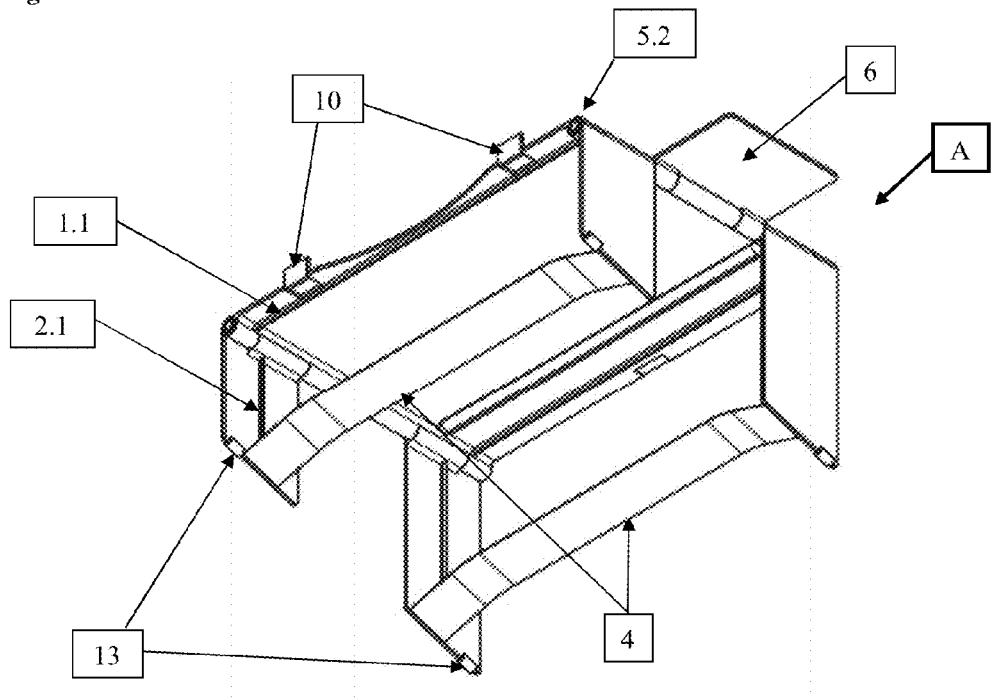
Figure 2D:
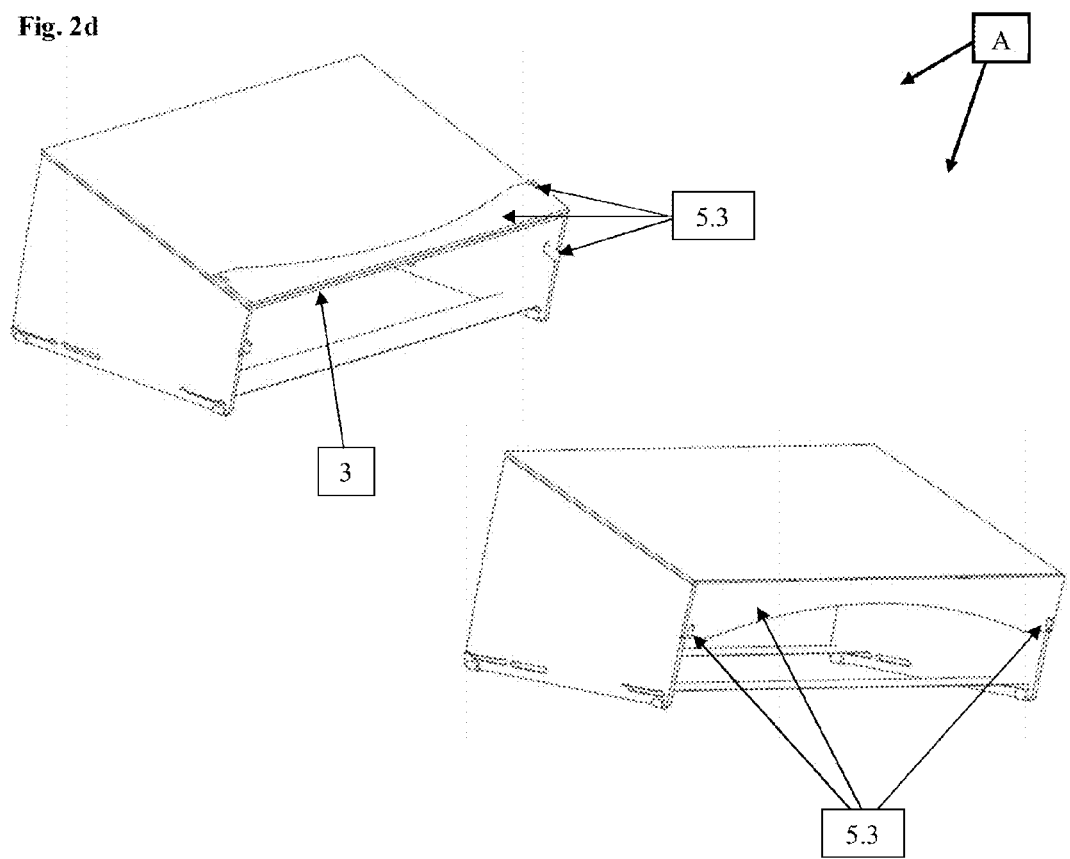
Figure 2E:
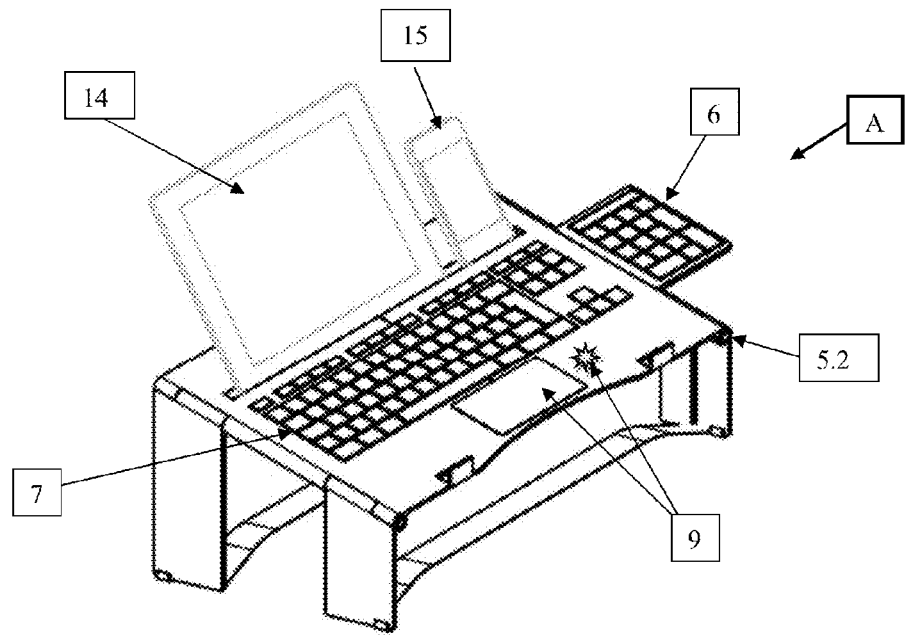

FIGS. 2a-2f are detailed representations of embodiments of a multifunction support A and B with several advantageous options. The plate 1 of the support A is essentially in a plane and attached by the hinges 3 to the feet 2. The feet 2 are held in the unfolded position at 90° relative to the plate (position of use) by the locking device 5. Three locking systems are represented: FIG. 2a shows the locking system type articulated gusset 5.1. FIGS. 2b, 2c and 2e show a blocking system 5.2 integrated inside the hinges 3. Indeed, in this case, the locking system 5.2 includes a push button at the front of each side of the plate 1 which unlocks the rotation of the feet and blocks them at certain predetermined positions, including 0° and 90°. The same locking system 5.2 can also be used to block the position of a keypad 6 in certain positions, in particular at 0°, 90° and 180°. FIG. 2d shows a locking system of a pin-type 5.3. Fixations attached to the feet 2 are inserted into cut-outs in an articulated strip 5.3 linked to the plate. Magnets or other fixations can be used to maintain the strip in contact with the feet 2 and to ensure the function of blocking the feet in use position. There may be two strips with a similar blocking system on both sides of the plate. In the folded storage position, these strips rotate to come into contact with the upper face of the plate 1.

Figure 2F:
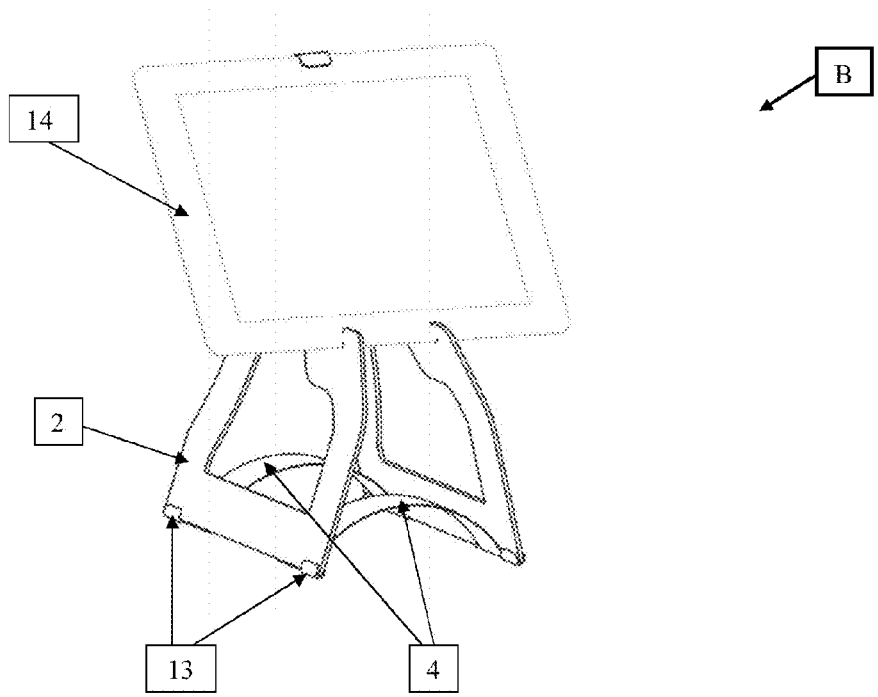

The supports A and B shown also include two straps 4 attached to the feet 2. FIGS. 2a and 2d show the straps 4 which have essentially the same length as the distance between the fixations of the straps to the feet, while FIGS. 2b, 2c, 2e and 2f show the straps that are slightly longer than the distance between these fixations. This provides comfort by distributing the load on the thighs. The height of feet 2 is different between the front and the back so as to obtain an angle of inclination of the plate. Ribs on the feet 2.1 and under the plate 1.1 provide more rigidity and strength. To avoid scratching the surfaces on which would lay the support, non-slip rubbers 13 are added under the feet 2. Along the lower side of the plate, adjustable removable or fixed stops will prevent the computer, book or documents from slipping off the support. The support B of FIG. 2f is designed to be placed on one thigh.

FIG. 2 also shows the following elements: a keyboard 7 integrated into the plate 1, a keypad 6, a pointing device 9 (such as a touchpad or trackball or joystick), a holding system to maintain a tablet or smartphone (e.g. in the form of a rail or similar), optional clips 11 can be used to temporarily attach objects to support (e.g. a cup holder, papers, pens or pencils), end stops 10 may be used to prevent objects from slipping off the plate 1. To get a support as thin as possible in the folded position, the elements out of the plane of the plate can be retractable or removable. For example, the joystick can be clipped to the plate 1.

Figure 3:
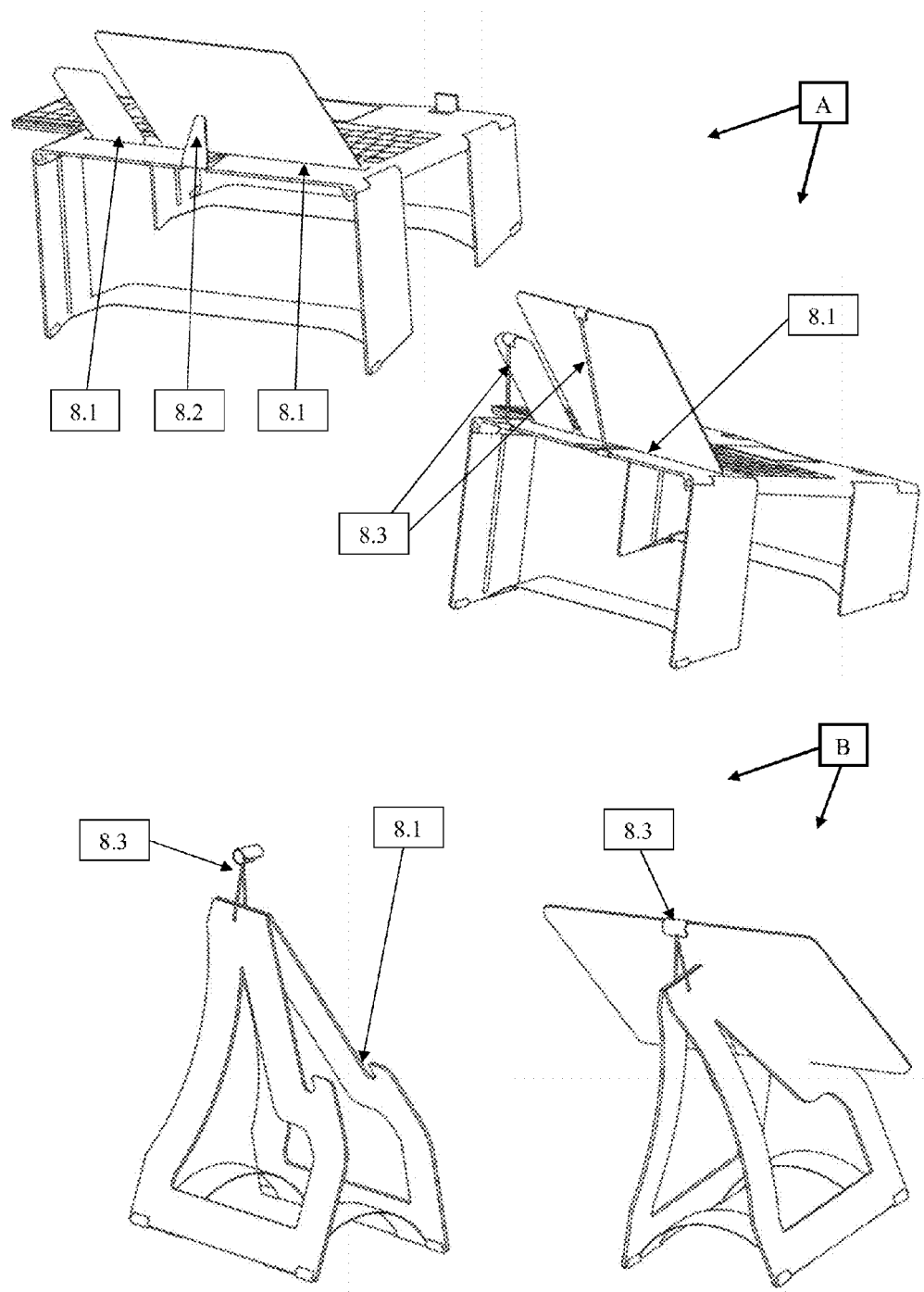
FIG. 3: shows three-dimensional views of various supports for a tablet computer and/or screen, and/or smartphone.

FIG. 3 shows two drawings of the support A and two drawings of the support B where several systems to maintain a tablet computer (iPad® type) and/or a smartphone (iPhone® type) are highlighted. One (or more) groove(s) or rail(s) or cut-out(s) 8.1 allow to clip the iPad® and/or iPhone® and maintain them, not in the plane of the plate but at a certain inclination angle relative to the plate, the display being fixed in either landscape or portrait positions. This rail can optionally be adjustable in rotation thanks to an additional hinge. The holding should be firm enough so that the user can push on the touch screen in a convenient and comfortable way. Among other possibilities, a suitable system comprises a groove or rail (which may be magnetic) for the lower side of the device and another system to further hold the back face, the upper side or the sides of the device. Holding the lower side may not be enough. By moving the assembly (support and electronic device(s)), there may be a risk for the device(s) to loosen and to slip off. There are several ways to strengthen the holding of these accessories on the support. Here are three examples:

- The second drawing of the FIG. 3 shows an elastic or cord or rigid rod 8.3 (optionally with adjustable length) with fixations at both ends, one end being attached to the plate 1 (support A) or to a foot (support B) and the other end to the device (preferably in the upper area).
- The first drawing of the FIG. 3 shows an articulated piece 8.2 (gusset type) clipped on the back of the computer or phone or in a shell case holding this device. This gusset can be part of the plate and, thanks to a hinge, will be in the plane of the plate (folded position) or tilted to clip and hold the device (working position). Several gussets can be foreseen for positioning multiple devices at the same time on the support.
- The last two drawings of FIG. 3 show the support B without plate (with and without iPad®). The contour of the feet contains a profile 8.1 for clipping the tablet (iPad®). To avoid scratching or damaging the device, a flexible material (e.g. foam or rubber) can be applied on the edges of the profile. A holding device 8.3 (cord, rod or elastic with fixations at both ends) to reinforce the anchoring of the device to the support.

FIGS. 4a-4i show two different supports in folded position for storage or transport, and their folding mechanism.

Figure 4A:
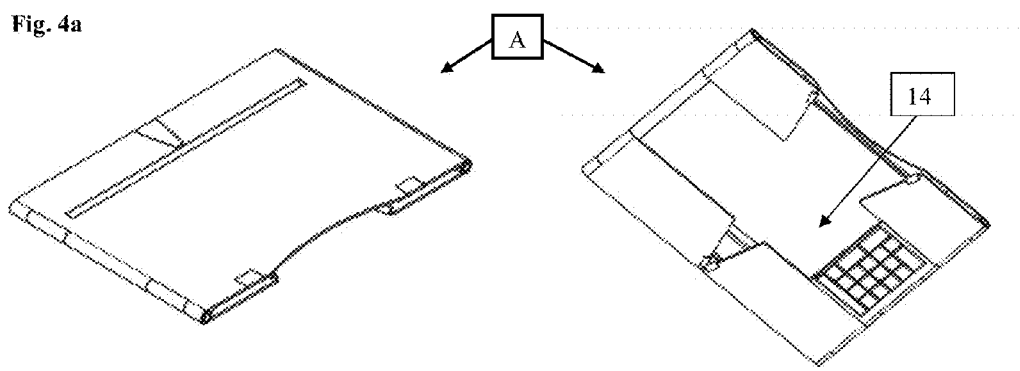
FIGS. 4a-4i: show three-dimensional views of closures or withdrawal of the support: the "plate", feet, straps, keypad, as well as various options to store an iPad® and/or iPhone® between the feet and the platform or between the two halves of the plate.

FIG. 4a shows a support A folded with a multitude of accessories described above, all in the plane of the plate or a parallel plane. The thickness of the whole support in the folded position is thin, even when an electronic accessory such as an iPad® 14 is stored inside, and can take easily place in a computer bag (laptop, notebook, ultrabook, tablet, e-reader, . . . ).

Figure 4B:
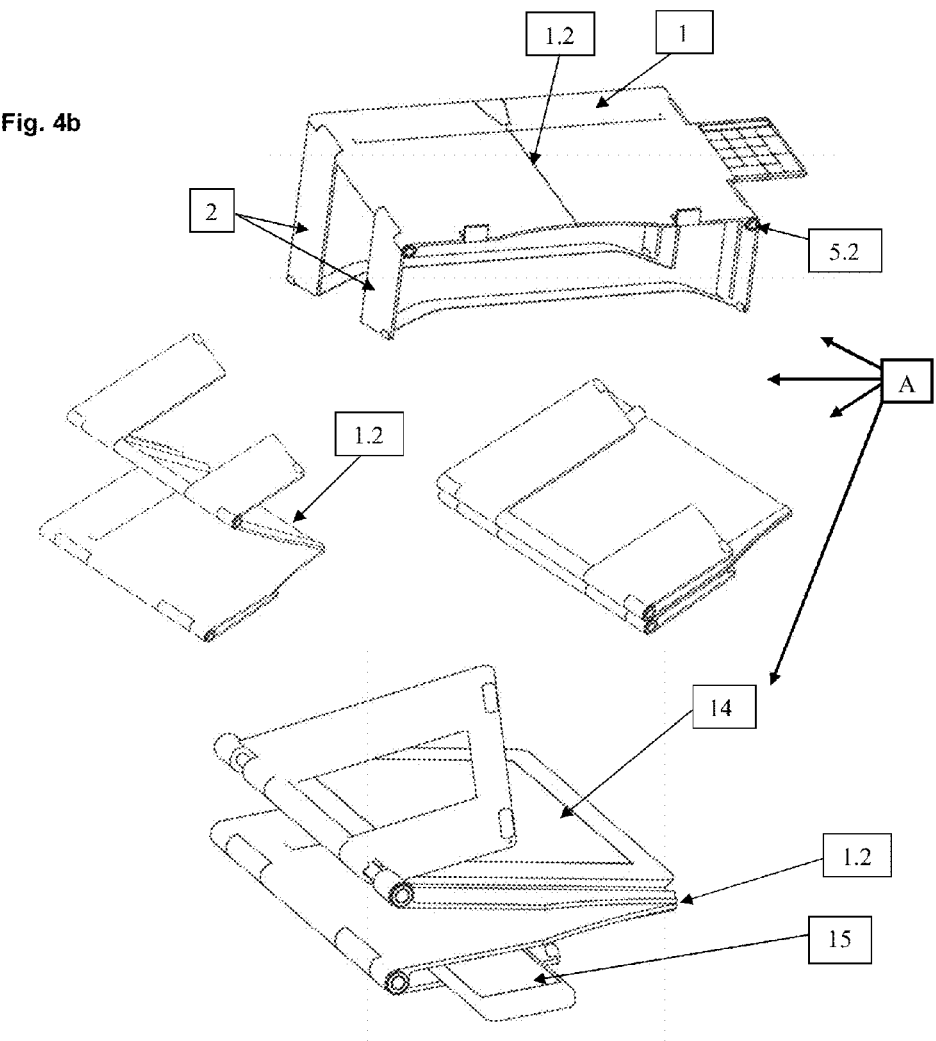

FIG. 4b shows the same media where an additional articulation 1.2 through the center of the plate. This allows an additional fold and halve surface clutter. The thickness of the whole folded support is then twice larger. With this additional articulation, the surface in folded position is then similar to the surface of a tablet computer and the support can be transported in smaller bags specific to tablet computers. The bottom figure shows that the support can act as cover or case for storing e.g. an iPad® 14 and/or a smartphone 15.

Figure 4C:
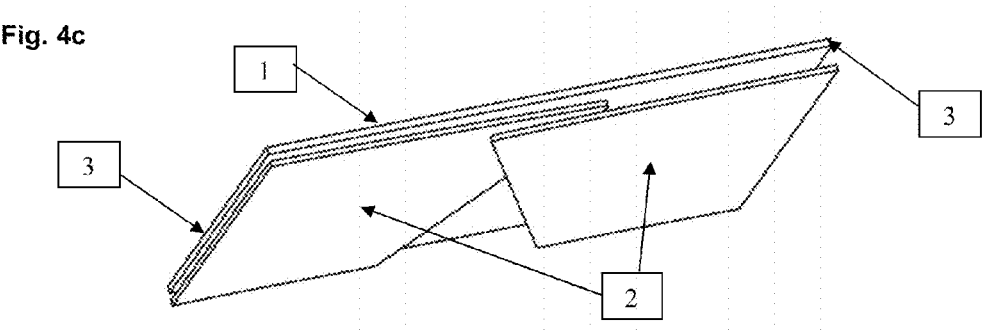

FIG. 4c shows a simplified support A, where the length of the feet 2 is greater than half the width of the plate 1. In the folded position, the feet are overlapping and superimpose. This provides a working height (the highest point of the support) greater than half the width of the plate, this height being then able to reach the total width of the plate.

Figure 4D:
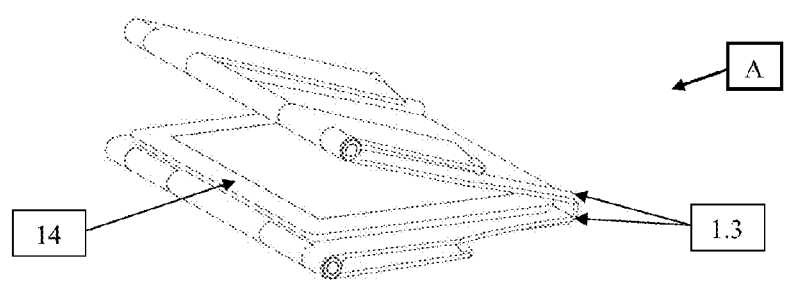

FIG. 4d shows a support with a double hinge 1.3 in the plate for housing an iPad® 14 between the two halves of the plate.

Figure 4E:
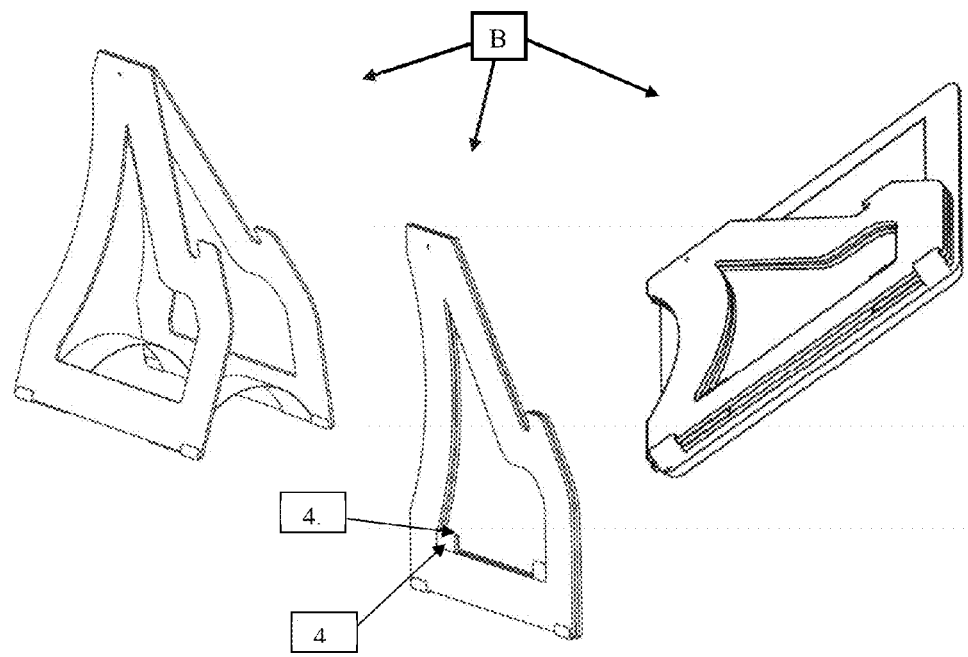

FIG. 4e shows that a support B can easily be stored with the electronic device.

Figure 4F:
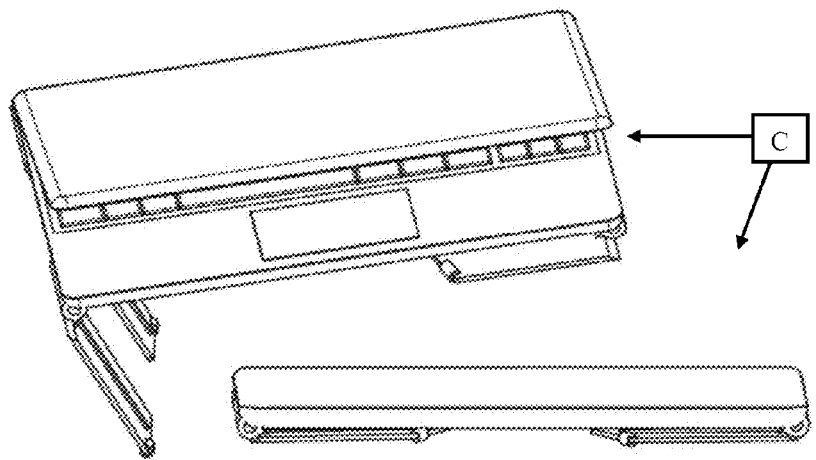

FIG. 4f shows a case where the feet are directly attached to the frame of the computer or to a shell or case clipped on the computer (laptop, notebook, ultrabook, tablet, e-reader, . . . ).

Figure 4G:
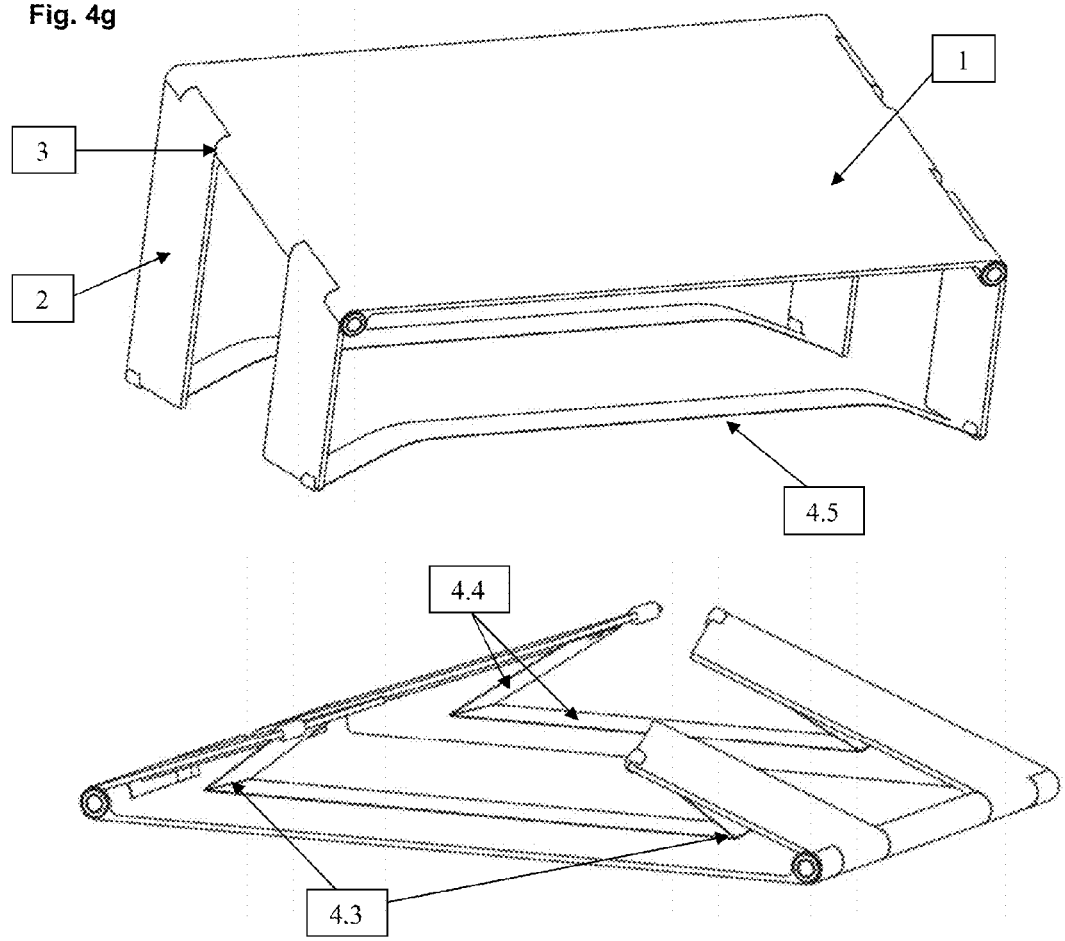
Figure 4H:
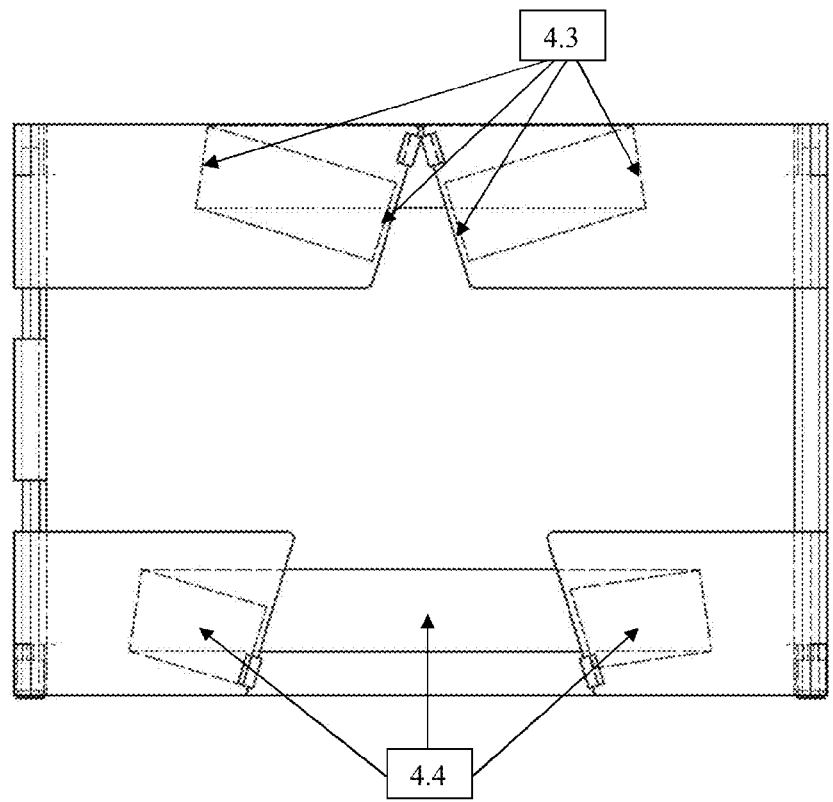

FIGS. 4g and 4h show variants wherein the straps 4.4 are easily stored thanks to a folding mechanism of the straps with parts 4.3 acting as hinges.

Figure 4I:
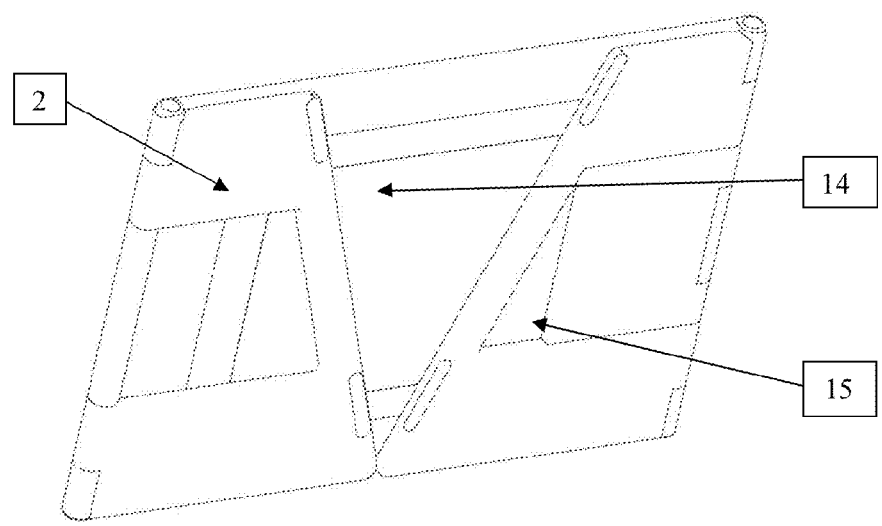

FIG. 4i shows the storage or housing of, for example, an iPad® 14 and an iPhone® 15 between the feet 2 and the plate 1.

Figure 5:
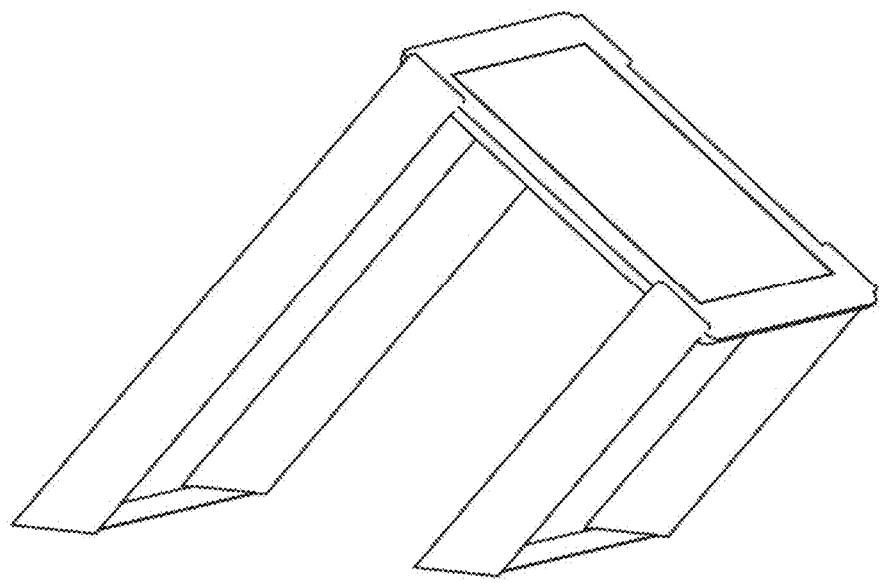
FIG. 5: shows two three-dimensional detailed views of other embodiments of the support showing the folding of the straps during the closing of the feet.
Figure 5:
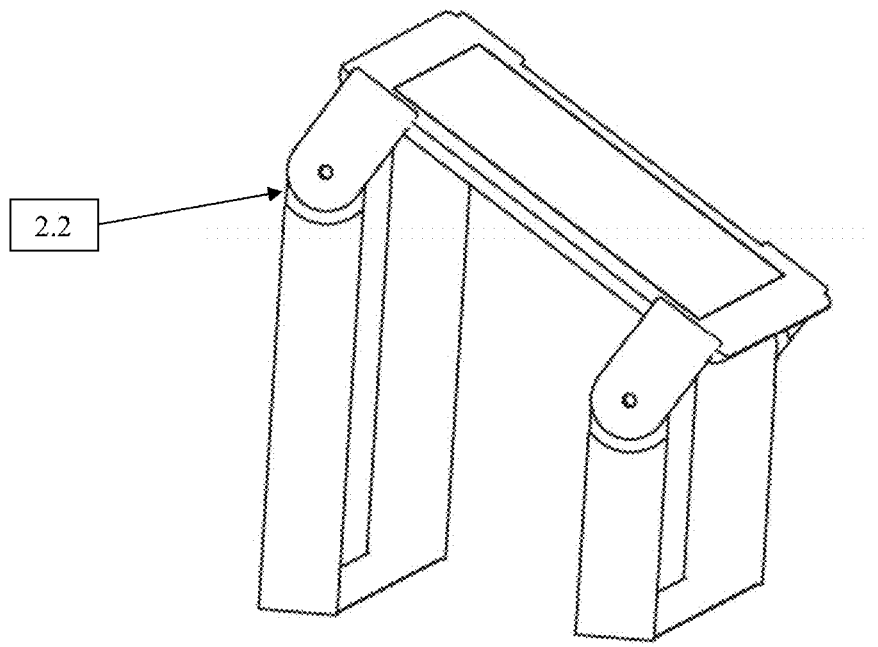

FIG. 5 shows a support where the feet are directly attached to a tablet computer. The bottom figure shows an additional hinge 2.2 in the feet designed in a plane orthogonal to the plane of the hinge. It allows to rotate the feet along the axis of the thighs, which reduces the length of the feet and therefore their weight and gives more stability to the whole moving the center of gravity towards the center of the plate. One extra advantage is that the maximum working height for a defined plate size is higher, as feet can't ideally protrude the plate in the folded position. The higher the working height is, the longer the feet are and the more benefits this extra articulation brings. To increase the working height, it is also possible to use telescopic feet or feet with an extra hinge for folding on itself.

Figure 6:
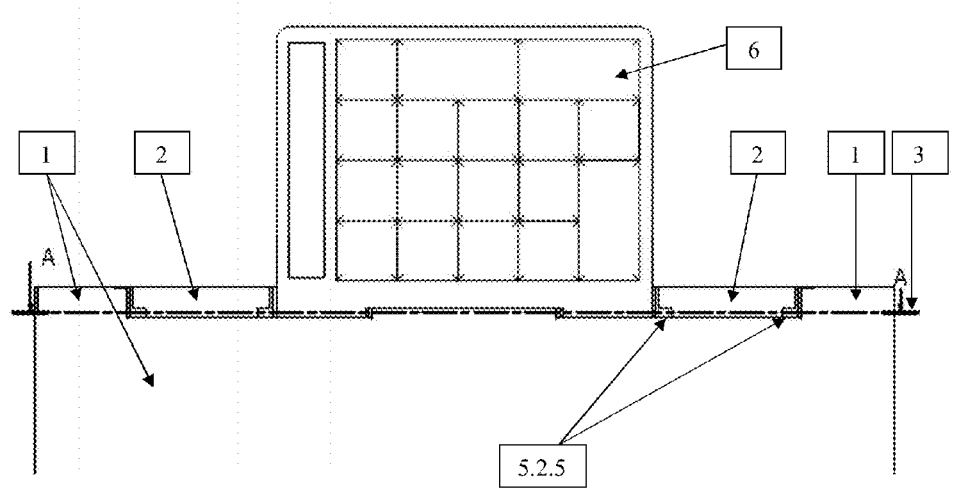
FIGS. 6 and 7: show three-dimensional views and sectional views of hinges.
Figure 6:
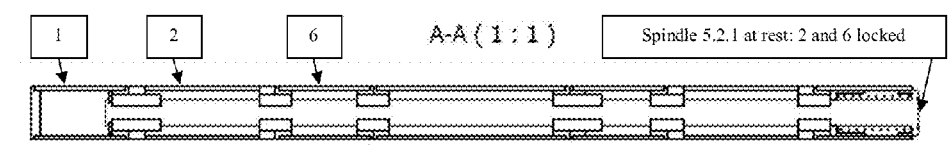
Figure 6:
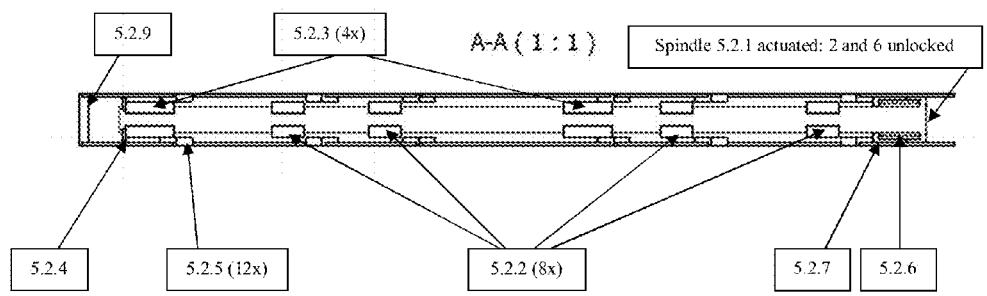

FIG. 6 shows the longitudinal section A-A in the hinge 3, explaining the principle of locking and unlocking of the two feet 2 and keypad 6 relative to the plate 1. The first drawing helps understanding where the cut is made. The feet 2, the plate 1 and the keypad 6 are all ending in a tubular shape. These tubes are aligned and are traversed by a spindle or pin 5.2.1, acting as a hinge 3 and as a locking/unlocking system 5. The end of the spindle at the front side of the support A is formed by a cylindrical surface acting as a push button. Keys (eight short 5.2.2 and four long 5.2.3) are placed on both sides of the axis 5.2.1. These pins are inserted and guided in cross shaped pieces 5.2.5, which are locked in rotation by a lug 5.2.8: female part on all the pieces 1, 2 and 6, and male part on the cross shaped pieces 5.2.5. The second drawing shows the cut in the rest position (without pressure on the button of the spindle 5.2.1). The keys 5.2.2 and 5.2.3 are in front of cross shaped pieces 5.2.5 and the spindle 5.2.1 is blocked against rotation: the feet 2 and the keypad 6 can't rotate relative to the plate 1. The third picture shows the cut in the actuated position when the user presses the button on the spindle 5.2.1. The short eight keys 5.2.2 move out of the cross shaped pieces 5.2.5 and the spindle is then released in rotation: the feet 2 and the keypad 6 can rotate relative to the plate 1. The user then chooses the angle of the feet 2 (in this example 0 or 90° relative to the plate) and the angle of the keypad 6 (0, 90 or 180°). Indeed, the short keys 5.2.2 find back one of the openings in the cross shaped piece for every multiples of 90°. By then releasing the pressure on the button, the spindle 5.2.1 returns and the short keys 5.2.2 take back their position inside the cross shaped pieces 5.2.5, and thus block again the hinge 3. The interest of the long keys is to always keep the blocking of the spindle relative to the plate. There is only an interest to articulate the feet 2 and the keypad 6. If the spindle rotates relative to the plate, it would be more difficult to re-align the spindle to lock the hinge 3. As the keys 5.2.3 are longer, they do not leave cross shaped pieces attached to the plate and thus keep the spindle and the keys in the same angular position relative to the plate. A spring 5.2.6 is used to bring the spindle 5.2.1 back in rest position, when the pressure on the button is released. A piece 5.2.7 serves as a stop to limit the stroke of the spindle, as a guide and as a contact surface for the spring 5.2.6. A cap 5.2.9 is inserted into the rear end of the hinge.

Figure 7:
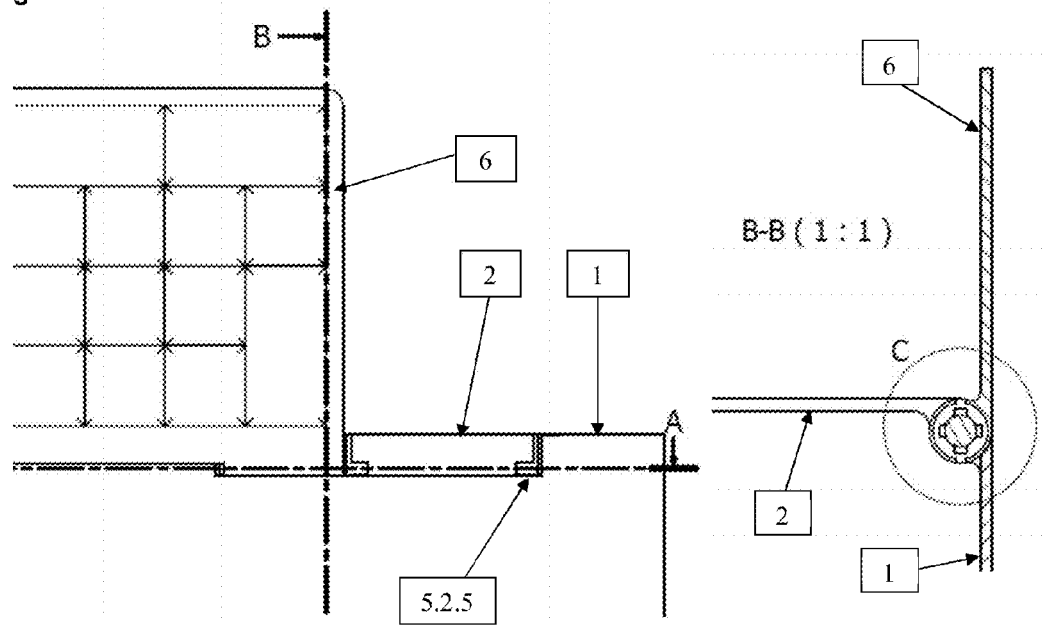
Figure 7:
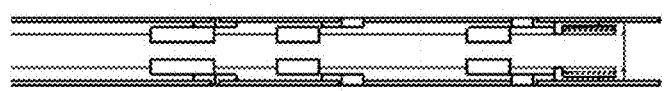
Figure 7:
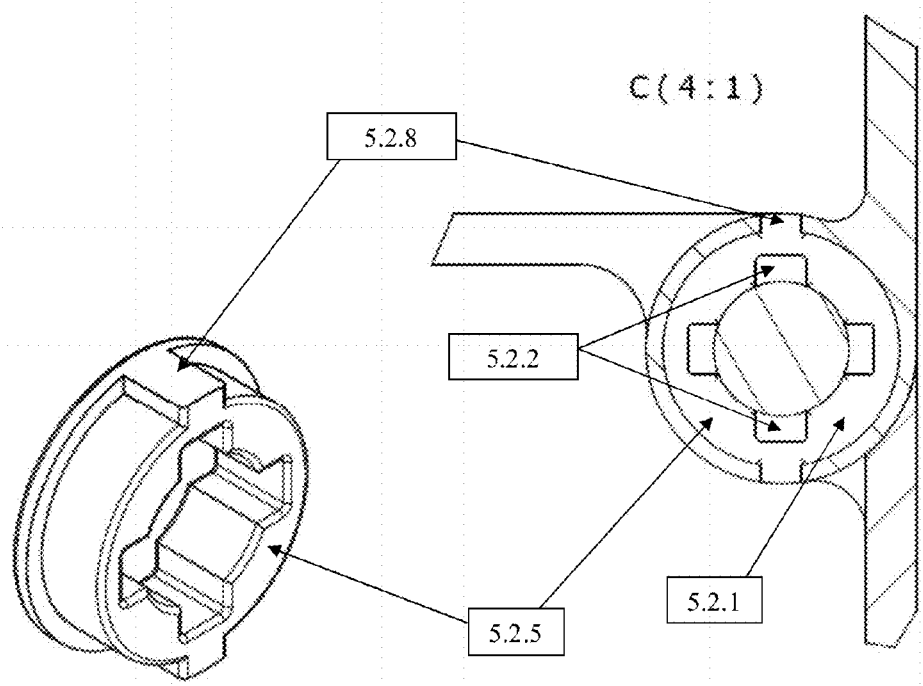

FIG. 7 shows a cross section B-B in the hinge 3 with an enlarged detail C. This specifies the cross shaped piece 5.2.5 that is blocked in rotation by the ergots 5.2.8: the female part on each of the pieces 1, 2, and 6 and the male part on the cross shaped pieces 5.2.5.

FIG. 8 shows three-dimensional views of a support type B' serving as a support (use or unfolded position) and as a case or cover for transportation or storage (folded position).

Figure 8A:
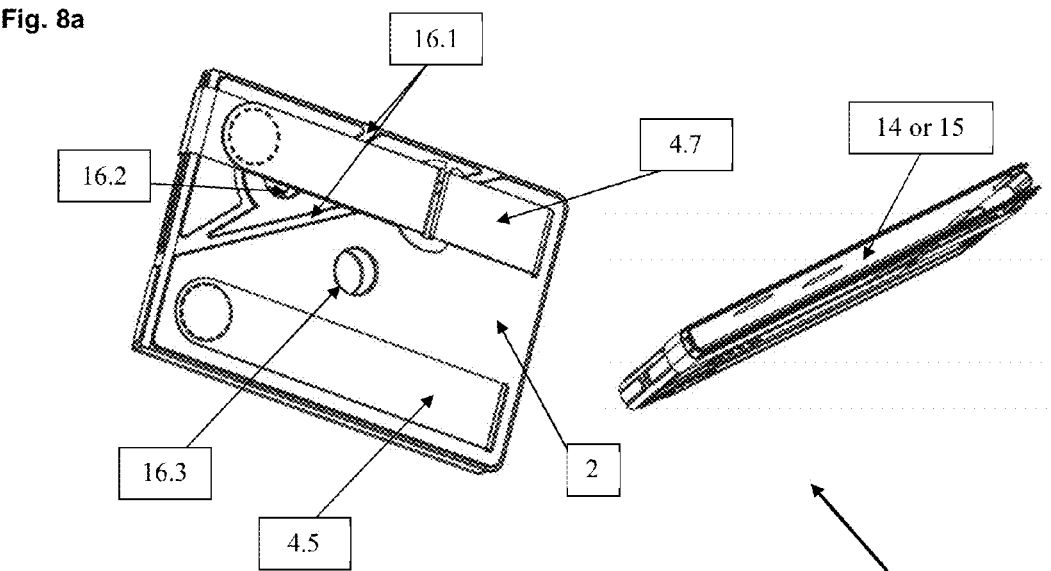
FIGS. 8a-8c: shows three-dimensional views of a type B' support serving as inclined support (for a tablet, smartphone or other electronic device) and as storage case to transport the same device.

FIG. 8*a* shows the support B' in the folded position (closed case). It allows to integrate a tablet computer 14 which is maintained through the hole 16.3 in the feet 2 (or side of the case). The straps 4.5 and 4.7 ensure the closure of the case. Folding lines 16.1 and 16.2 the hole are not used in this folded position.

Figure 8B:
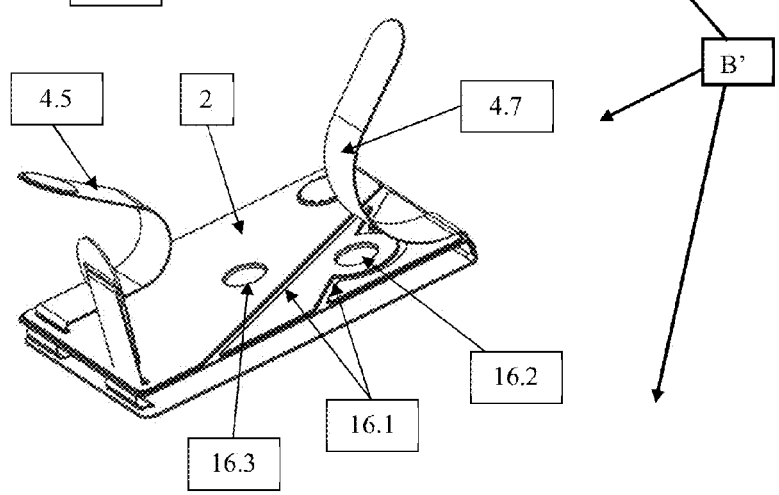

FIG. 8*b* shows the opening of the straps 4.5 and 4.7.

Figure 8C:
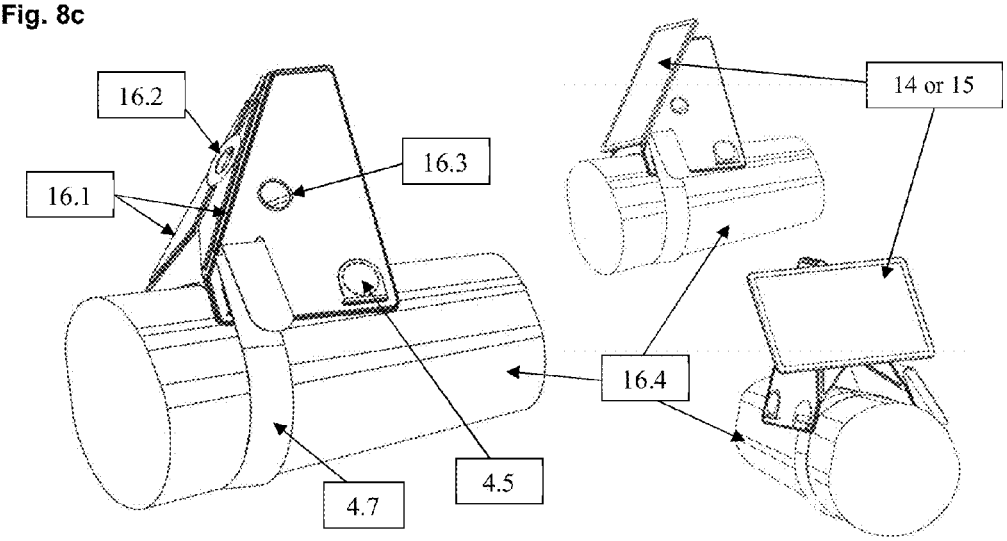

FIG. 8*c* shows the support B' in the unfolded or use position (open) on a thigh 16.4 (a figure without tablet, a figure with a tablet in landscape mode and a figure with tablet in portrait mode). Folding was made along the lines 16.1. The holes 16.2 in the two feet are superposed to attach the tablet 14 and freeze the position of the feet and the whole support assembly. The strap 4.7 is longer and allows surrounding the thigh for better holding and stability of the whole assembly (support+tablet). The strap 4.5 is shorter and allows only to lay the support on the thigh. The positions of the straps are fixed and defined for different positions thanks to Velcro® type fasteners. The hole 16.3 is not used in the unfolded or use position (open).

FIG. 9 shows a series of photos of a support B' explaining its opening or closing along the fold lines and the system of holes in the feet overlapping to attach a tablet and hold the entire support in position.

Figure 9A:
FIGS. 9a-9k: shows a series of photos of a type B' support explaining its opening or closing along the folding lines, as well as the system of overlapping the holes in the feet to secure a tablet, smartphone or any other electronic device.

FIG. 9*a* shows the support (the case) in folded and locked position thanks to the straps.

Figure 9B:
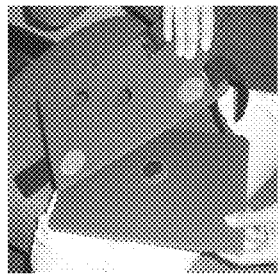

FIG. 9*b* shows the unfolding of the support (the opening of the case) and the release of the tablet, which was housed inside.

Figure 9C:
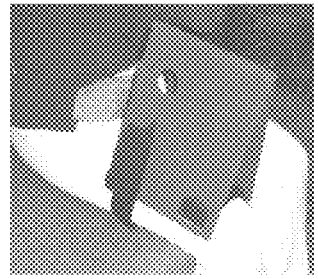

FIG. 9*c* shows the support secured to the thigh.

Figure 9D:
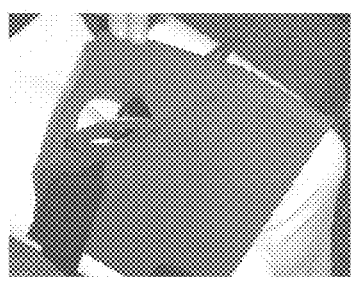

FIG. 9*d* shows that pushing on the corner will force the support to bend along the preset folding lines in the feet.

Figure 9E:

FIG. 9*e* shows that after a first folding two shapes with holes (here circular) appear on both feet.

Figure 9F:

FIG. 9*f* shows a second fold to superimpose the two holes.

Figure 9G:
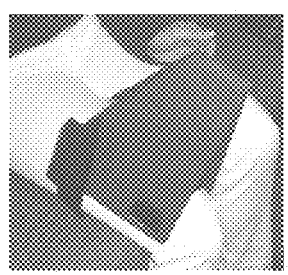

FIG. 9*g* shows the support in unfolded or use position (open), ready to plug the tablet.

Figure 9H:

FIG. 9*h* shows the clipping or securing of the tablet computer (or its shell case) on the support with the holes in the superimposed feet.

Figure 9I:

FIG. 9*i* shows the tablet attached to the support, in landscape position. We see that it offers an ergonomic working position and the use of both hands to work. The work is relaxing in the sense that there is no need to support the weight of the tablet with one hand.

Figure 9J:
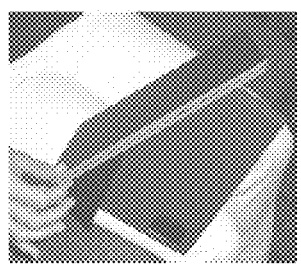

FIG. 9*j* shows that it is in this case possible to easily tilt the tablet. It can rotate for applications where the angle of the tablet is useful, or just to go from a portrait mode to landscape mode or vice versa.

Figure 9K:
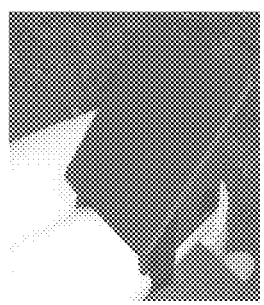

FIG. 9*k* shows the tablet in portrait mode.

Figure 10:
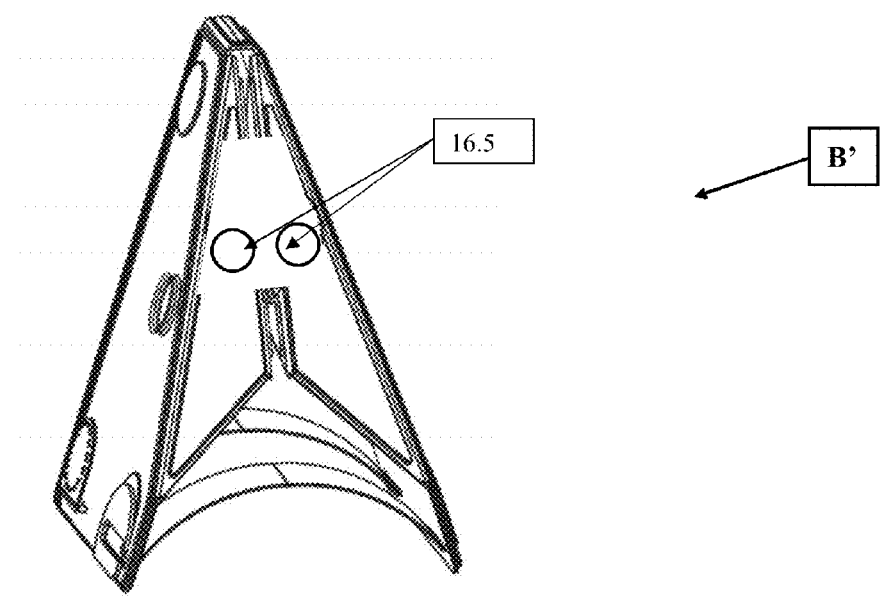
FIG. 10: shows a variant of the type B' support from FIGS. 8a-8c with an instantaneous magnetic docking system for an iPad® to the support B', which allows to orient the iPad® in a portrait or landscape mode.
Figure 10:
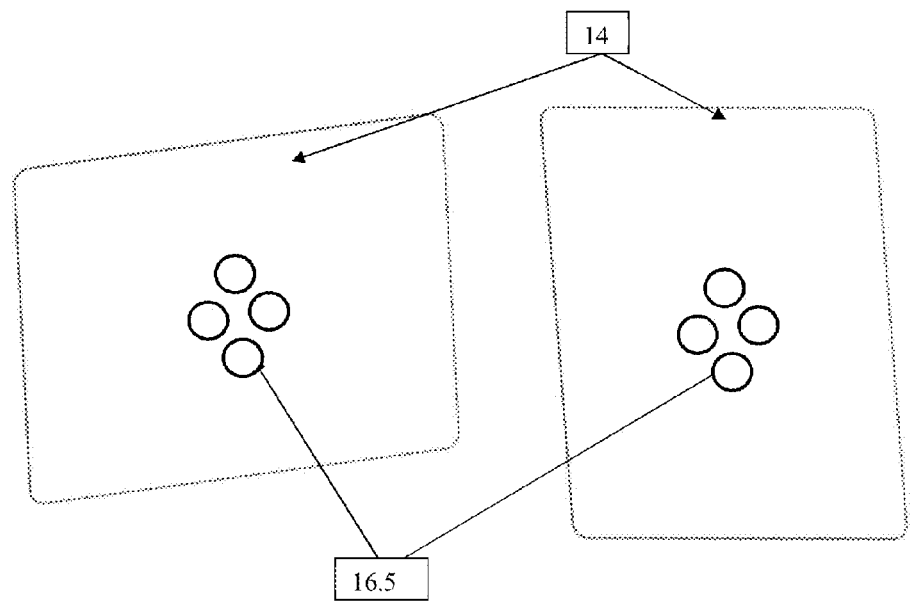

FIG. 10 shows an alternative support B' with which an electronic device such as an iPad® 14 may be secured to the support by means of magnets 16.5 in two different orientations (horizontal or vertical).

Figure 11:
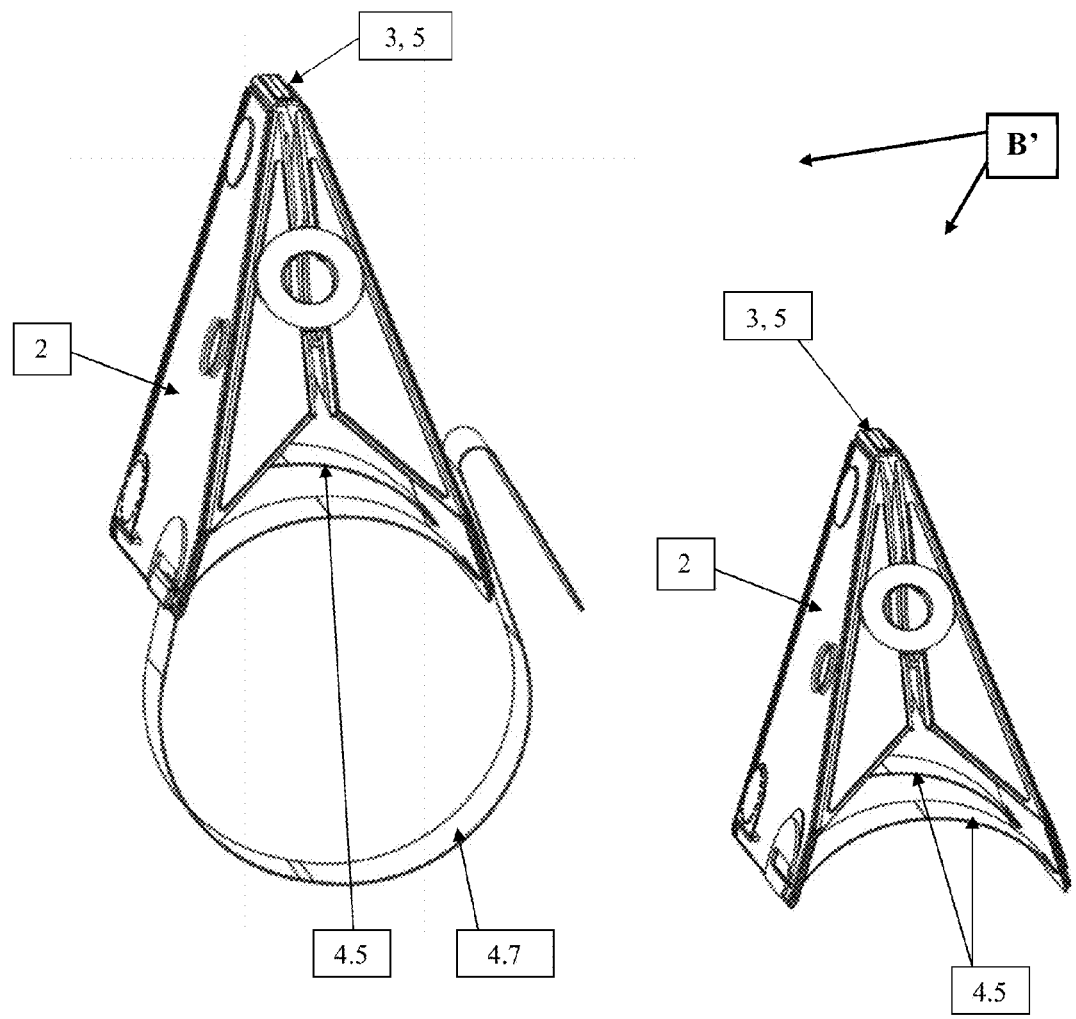
FIG. 11: shows other views of the type B' support from FIGS. 8a-8c, FIG. 12: relates to an alternative of the type A support in different views.

FIG. 11 shows the support B' of FIGS. 8*a*-8*c*, from two other angles.

Figure 12:
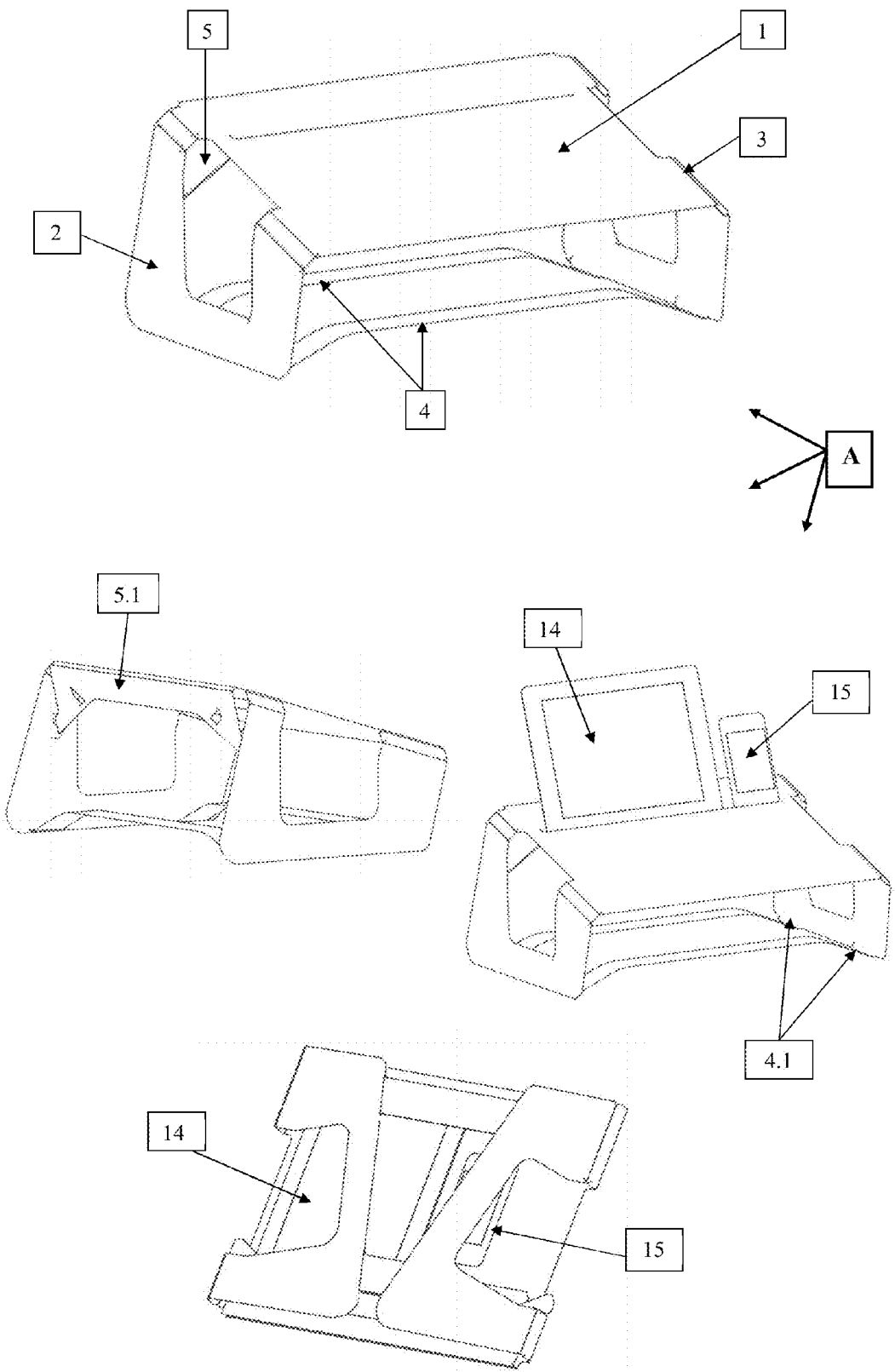

FIG. 12 shows a support of type A with the hinges 3, a locking system 5.1, the feet 2 and the plate 1, all made of one piece during molding. When folded, the support forms a cavity for housing or storing one or more electronic devices 14, 15.

Figure 13:
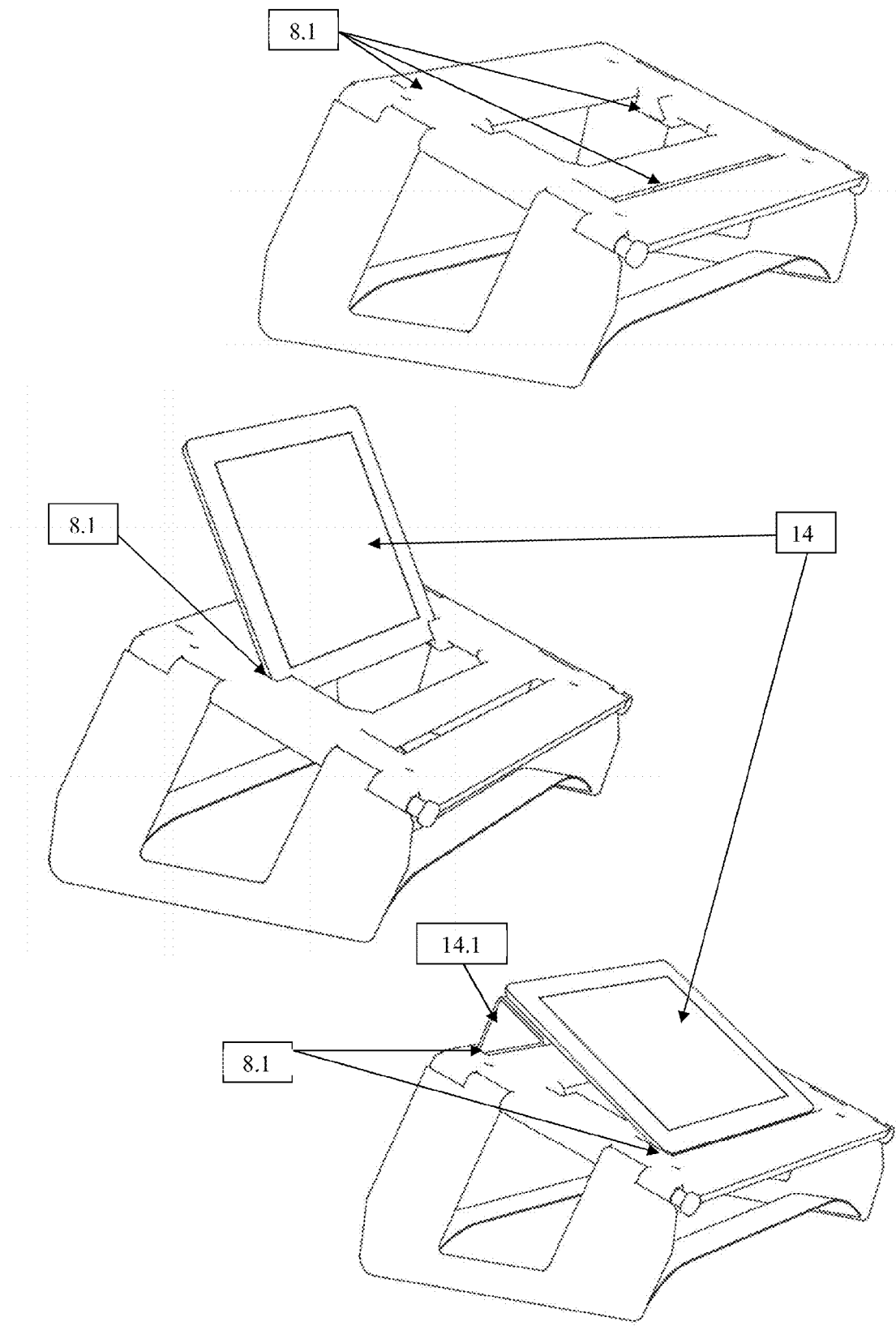
FIG. 13: provides various views of an alternative of the type A support from FIG. 12.

FIG. 13 shows a support that has several geometries in the plate to use either a laptop/notebook/ultrabook computer or a tablet (type iPad®/e-reader, . . . ) in a practical and ergonomic way. For use with a laptop or notebook, four small notches are designed into the plate to receive the feet of the laptop or notebook and prevent from slipping. For use with an iPad® and its Smartcover® (or other case on the market), two working positions are foreseen thanks to two grooves or slots on the plate: one groove in the bottom of the plate to hold the bottom side of the iPad® and another groove in the top of the plate to receive and hold the Smartcover® (cover in use or open position). The working angle is then the sum of the angles of the support and the Smartcover®. In this position, the iPad® will rather be used to work, type in text, browse the net, . . . . Another slot in the center of the support allows to plug the iPad® to hold it in a more upright position. This allows to use the tablet for "presentations" (like powerpoint, slideshows, reading, . . . ) or watch a movie.

The invention claimed is:

1. Ultraportable support, comprising
    at least two opposed feet attached using hinges allowing rotation of said feet,
    a locking system of the hinges allowing to maintain the feet into at least two different angular positions, one of said positions corresponding to a folded position for transport or storage and another angular position corresponding to an unfolded position for support utilization, and
    at least two straps, wherein each of the at least two straps has substantially constant width over entire length of said straps, each of the straps being attached to the two opposed feet at a location of the foot distant from the hinges.

2. The support according to claim 1, wherein the locking system is integrated in the hinges.

3. The support according to claim 1, wherein the feet are fixed indirectly to both laterally opposite sides of a plate and wherein the angular positions of the feet relatively to the plate comprise a value of about 0° for transport or storage in the folded position and a value between 60 and 120° for utilization in the unfolded position.

4. The support according to claim 3, wherein the plate has an inclination angle between 2 and 70° relatively to the horizontal when it is placed in the unfolded position on a flat and horizontal contact surface.

5. The support according to claim 3, further comprising one or more hinge(s) through the plate.

6. The support according to claim 3, further comprising a fastening system for a tablet computer, a laptop/notebook/ultrabook computer, a smart phone or a screen.

7. The support according to claim 6, wherein the fastening system is formed by a groove or slot in the plate and comprises attachment means for plugging a tablet computer, smart phone or screen in an inclined plane relatively to the plate, preferably pivoting.

8. Ultraportable support, comprising
- at least two opposed feet attached using hinges allowing rotation of said feet;
- a locking system of the hinges allowing to maintain the feet into at least two different angular positions, one of said positions corresponding to a folded position for transport or storage and another angular position corresponding to an unfolded position for support utilization, wherein the locking system is integrated in the hinges; and
- at least two straps, wherein each of the at least two straps has substantially constant width over entire length of said straps, each of the straps being attached to the two opposed feet at a location of the foot distant from the hinges,
- wherein the feet are fixed indirectly to both laterally opposite sides of a plate, and wherein the angular positions of the feet relatively to the plate comprise a value of about 0° for transport or storage in the folded position and a value between 60 and 120° for utilization in the unfolded position,
- wherein the plate has an inclination angle between 2 and 70° relatively to the horizontal when it is placed in the unfolded position on a flat and horizontal contact surface, and
- wherein the ultraportable support further comprises
- one or more hinge(s) extending through the plate; and a fastening system formed by a groove or slot in the plate, the fastening system comprising attachment means for plugging a tablet computer, smart phone or screen in an inclined plane relatively to the plate, preferably pivoting.

* * * * *